US010986209B2

(12) United States Patent
Azgin et al.

(10) Patent No.: US 10,986,209 B2
(45) Date of Patent: Apr. 20, 2021

(54) SECURE AND RELIABLE ON-DEMAND SOURCE ROUTING IN AN INFORMATION CENTRIC NETWORK

(71) Applicant: Futurewei Technologies, Inc., Plano, TX (US)

(72) Inventors: Aytac Azgin, Santa Clara, CA (US); Ravishankar Ravindran, San Ramon, CA (US)

(73) Assignee: Futurewei Technologies, Inc., Plano, TX (US)

( * ) Notice: Subject to any disclaimer, the term of this patent is extended or adjusted under 35 U.S.C. 154(b) by 75 days.

(21) Appl. No.: 15/957,658

(22) Filed: Apr. 19, 2018

(65) Prior Publication Data
US 2019/0327337 A1 Oct. 24, 2019

(51) Int. Cl.
*H04L 29/08* (2006.01)
*H04L 12/733* (2013.01)
*H04L 12/755* (2013.01)
*H04L 12/725* (2013.01)

(52) U.S. Cl.
CPC .......... *H04L 67/327* (2013.01); *H04L 45/021* (2013.01); *H04L 45/20* (2013.01); *H04L 45/306* (2013.01)

(58) Field of Classification Search
CPC ..... H04L 67/327; H04L 45/021; H04L 45/20; H04L 45/306
See application file for complete search history.

(56) References Cited

U.S. PATENT DOCUMENTS

| 5,479,514 A * | 12/1995 | Klonowski ............... H04L 9/32 380/277 |
| 8,559,434 B2 * | 10/2013 | Esteve Rothenberg ..................... H04L 45/00 370/392 |
| 9,137,152 B2 * | 9/2015 | Xie .......................... H04L 45/44 |
| 9,503,365 B2 * | 11/2016 | Mahadevan .......... H04L 45/566 |
| 10,033,639 B2 * | 7/2018 | Garcia-Luna-Aceves ................... H04L 45/021 |
| 10,069,736 B2 * | 9/2018 | Oran ....................... H04L 45/72 |

(Continued)

FOREIGN PATENT DOCUMENTS

| CN | 101009841 A | 8/2007 |
| CN | 107248956 A | 10/2017 |

OTHER PUBLICATIONS

Machine Translation and Abstract of Chinese Publication No. CN107248956, Oct. 13, 2017, 33 pages.

(Continued)

*Primary Examiner* — Scott B Christensen
*Assistant Examiner* — Fadi Haj Said
(74) *Attorney, Agent, or Firm* — Conley Rose, P.C.

(57) ABSTRACT

A method implemented by a first content network element (NE) in an information centric network (ICN), the method comprising receiving, by a receiver, an interest packet through a first interface, wherein a header of the interest packet comprises a path filter, the path filter being associated with one or more segments on a path from a consumer to a producer, modifying, by a processor coupled to the receiver, the path filter based on information identifying one or more previous content NEs or one or more next content NEs on the path to produce a modified path filter, and transmitting, by a transmitter coupled to the receiver, the interest packet with the modified path filter to the next content NE.

13 Claims, 10 Drawing Sheets

(56) References Cited

U.S. PATENT DOCUMENTS

| | | | |
|---|---|---|---|
| 10,089,651 B2* | 10/2018 | Mahadevan | G06Q 30/0255 |
| 10,097,447 B2* | 10/2018 | Yao | H04L 29/06 |
| 10,156,917 B2* | 12/2018 | Ha | G06F 3/03545 |
| 10,277,481 B2* | 4/2019 | Azgin | H04L 45/306 |
| 10,291,512 B2* | 5/2019 | Moiseenko | H04L 47/805 |
| 2007/0195713 A1* | 8/2007 | Khan | H04L 45/28 |
| | | | 370/254 |
| 2011/0007629 A1* | 1/2011 | Atlas | H04L 45/50 |
| | | | 370/225 |
| 2012/0287791 A1* | 11/2012 | Xi | H04L 43/10 |
| | | | 370/237 |
| 2012/0287934 A1* | 11/2012 | Sarela | H04L 45/04 |
| | | | 370/392 |
| 2013/0060962 A1 | 3/2013 | Wang et al. | |
| 2014/0173018 A1* | 6/2014 | Westphal | H04L 41/0823 |
| | | | 709/213 |
| 2015/0256456 A1* | 9/2015 | Previdi | H04L 69/22 |
| | | | 370/392 |
| 2015/0350078 A1* | 12/2015 | Azgin | H04L 45/306 |
| | | | 370/392 |
| 2016/0094439 A1* | 3/2016 | Ravindran | H04L 45/306 |
| | | | 709/238 |
| 2017/0085441 A1 | 3/2017 | Azgin et al. | |
| 2017/0339228 A1 | 11/2017 | Azgin et al. | |
| 2017/0359254 A1* | 12/2017 | Oran | H04L 67/327 |
| 2018/0077051 A1* | 3/2018 | Nainar | H04L 45/745 |
| 2018/0145945 A1* | 5/2018 | Gupta Hyde | H04L 43/16 |
| 2018/0202323 A1* | 7/2018 | Lansell | F01K 27/02 |
| 2018/0227230 A1* | 8/2018 | Azgin | H04L 45/745 |
| 2018/0302323 A1* | 10/2018 | Moiseenko | H04L 45/745 |

OTHER PUBLICATIONS

Mosko, M., et al., "CCNx Messages in TLV Format," draft-irtf-icnrg-ccnxmessages-06, Oct. 29, 2017, 40 pages.

Azgin, A., et al., "Stateless Forwarding in ICN with Dynamic Non-Bloom Filters," 6 pages.

Azgin, et al., "pit/LESS: Stateless Forwarding in Content Centric Networks," 7 pages.

Pentikousis, K., Ed., et al., "Information-Centric Networking: Evaluation and Security Considerations," RFC 7945, Sep. 2016, 38 pages.

Foreign Communication From a Counterpart Application, PCT Application No. PCT/CN2019/083351, English Translation of International Search Report dated Jun. 3, 2019, 5 pages.

Foreign Communication From a Counterpart Application, PCT Application No. PCT/CN2019/083351, English Translation of Written Opinion dated Jun. 3, 2019, 4 pages.

* cited by examiner

SECURE AND RELIABLE ON-DEMAND SOURCE ROUTING IN AN INFORMATION CENTRIC NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a traditional network implementing a Transmission Control Protocol/Internet Protocol (TCP/IP) model, a consumer requesting content needs to first map a Uniform Resource Locator (URL) of the content to a producer having a content server. The producer mostly stays the same for a length of the session. The session may be bound to the server, and the goal of the session is to transfer the requested content from the producer to the consumer. In this host-centric networking paradigm, the core networking primitives revolve around naming hosts and network interfaces. Network devices are only configured to forward packets to the destination address.

In an Information Centric Network (ICN), a domain-wide unique name is assigned to each information object that is part of a content delivery framework, including routers, switches, or servers. Information objects may include data content, such as video clips or web pages. In an ICN, content routers are responsible for routing user requests to a producer and content to a requesting consumer. The content routers route packets based on name prefixes, which may be full content names or name prefixes of content names, instead of network addresses. Content delivery, such as publishing, requesting, and managing of the content, is based on the name of the content instead of the location of the content.

ICNs differ from Internet Protocol (IP) networks by perform ng in-network content caching, which may be on a temporary basis or a more persistent basis. This may allow content to be served from the network instead of an original content server, and thus may substantially improve user experience. The cached content may be used for real time data that is fetched by the user or for persistent data that belongs to the user or to a content provider, for example, a third party provider.

SUMMARY

According to one aspect of the present disclosure, there is provided a method implemented by a first content network element (NE) in an information centric network (ICN). The method comprises receiving, by a receiver, an interest packet through a first interface, wherein a header of the interest packet comprises a path filter, the path filter being associated with one or more segments on a path from a consumer to a producer, modifying, by a processor coupled to the receiver, the path filter based on information identifying one or more previous content NEs or one or more next content NEs on the path to produce a modified path filter, and transmitting, by a transmitter coupled to the receiver, the interest packet with the modified path filter to the next content NE.

Optionally, in any of the preceding aspects, another implementation of the aspect provides that the header of the interest packet comprises a value in a type field that indicates that the interest packet is a request for content from a producer using stateless packet forwarding.

Optionally, in any of the preceding aspects, another implementation of the aspect provides that the path filter comprises a first segment identifier identifying a first segment on the path, wherein the first segment comprises one or more consecutive links on the path, wherein an endpoint of the first segment is the first NE, and wherein the first segment identifier is encrypted.

Optionally, in any of the preceding aspects, another implementation of the aspect provides that modifying the path filter based on the next content NE on the path comprises adding a second segment identifier to the path filter after encrypting the second segment identifier, wherein the second segment identifier identifies a second segment on the path, wherein the second segment comprises one or more consecutive links on the path, and wherein an endpoint of the second segment is the next NE.

Optionally, in any of the preceding aspects, another implementation of the aspect provides that the path filter comprises one or more encrypted segment identifiers that can correspond to at least one of consecutive path segments, disjoint path segments or overlapping path segments.

Optionally, in any of the preceding aspects, another implementation of the aspect provides that the method further comprises storing, by a memory coupled to the processor, a database of alternative paths to NEs that are k hops away from the first content NE, wherein k is an integer value greater than or equal to 1.

Optionally, in any of the preceding aspects, another implementation of the aspect provides that the method further comprises receiving, by the receiver, a data packet comprising content requested by the consumer in response to the interest packet, wherein a header of the data packet comprises the modified path filter, obtaining, by the processor, a first segment identifier identifying a first segment on the path and a second segment identifier identifying a second segment on the path from the modified path filter, wherein the first segment comprises a plurality of consecutive links and includes the first content NE, and wherein the second segment comprises a plurality of consecutive links and includes a previous content NE towards the consumer, removing, by the processor, the first segment identifier from the header, and determining, by the processor, a segment along which to forward the data packet based on the first segment identifier.

Optionally, in any of the preceding aspects, another implementation of the aspect provides that the method further comprises storing, by a memory coupled to the processor, a database of alternative paths to content NEs that are k hops away from the first content NE, wherein k is an integer value greater than or equal to 1, decrypting, by the processor, the first segment identifier of the modified path filter in the header of the data packet in response to determining that a next interface in the first segment along which to forward the data packet is available, and transmitting, by the transmitter, the data packet along the next interface of the first segment in response to determining that the next interface in the first segment along which to forward the data packet is available.

Optionally, in any of the preceding aspects, another implementation of the aspect provides that the method further comprises storing, by a memory coupled to the processor, a database of alternative paths to the second content NE that are k hops away from the first content NE, wherein k is an integer value greater than or equal to 1, obtaining, by the processor, an alternative path to the second content NE when a next interface in the first segment along which to forward the data packet is unavailable, and transmitting, by the transmitter, the data packet along the alternative path to the second content NE in response to determining that the next interface in the segment along which to forward the data packet is unavailable.

According to one aspect of the present disclosure, there is provided a first content network element (NE) configured to operate in an information centric network (ICN), comprising a receiver configured to receive an interest packet from a consumer, wherein the interest packet is a request for content from a producer, a processor coupled to the receiver and configured to determine a second content NE on a path between the consumer and the producer, the interest packet including e a first segment identifier identifying a first segment on the path, the first segment comprising one or more consecutive interfaces connecting one or more NEs on the path, the first NE being one of the NEs of the first segment, add a header to the interest packet, wherein the header comprises a path filter associated with the first segment identifier, and a transmitter coupled to the processor and configured to transmit the interest packet comprising the header to the second content NE.

Optionally, in any of the preceding aspects, another implementation of the aspect provides that the path filter is determined by encrypting the first segment identifier according to a key associated with the second content NE.

Optionally, in any of the preceding aspects, another implementation of the aspect provides that the interest packet comprises a name of the content requested by the consumer.

Optionally, in any of the preceding aspects, another implementation of the aspect provides that the receiver is further configured to receive a data packet comprising the header from the second content NE, wherein a processor is further configured to determine a third content NE along which to forward the data packet based on the first segment identifier, and wherein the transmitter is further configured to transmit the data packet to the third content NE.

Optionally, in any of the preceding aspects, another implementation of the aspect provides that further comprising a memory coupled to the processor and configured to store a database of alternative paths to content NEs that are k hops away from the first content NE, wherein k is an integer value greater than or equal to 1.

Optionally, in any of the preceding aspects, another implementation of the aspect provides that further comprising a memory coupled to the processor and configured to store an encryption key associated with the second content NE, and wherein the transmitter is further configured to transmit an encryption key associated with the first content NE to a plurality of neighboring content NEs.

According to one aspect of the present disclosure, there is provided a first content NE configured to operate in an information centric network (ICN), the first NE comprising a receiver configured to receive an interest packet through a first interface, a header of the interest packet comprising a path filter, the path filter being associated with one or more segments on a path from a consumer to a producer, a processor coupled to the receiver and configured to modify the path filter based on information identifying on one or more previous content NEs or one or more next content NEs on the path to produce a modified path filter, and a transmitter coupled to the processor and configured to transmit the interest packet with the modified path filter to the next content NE.

Optionally, in any of the preceding aspects, another implementation of the aspect provides that the path filter comprises a first segment identifier identifying a first segment on the path, wherein the first segment comprises one or more consecutive interfaces connecting one or more content NEs on the path, wherein the first content NE is one of the content NEs of the first segment, and wherein the first segment identifier is encrypted.

Optionally, in any of the preceding aspects, another implementation of the aspect provides that the processor is further configured to add a second segment identifier to the path filter after encrypting the second segment identifier, wherein the second segment identifier identifies a second segment on the path, wherein the second segment comprises one or more consecutive links connecting one or more content NEs on the path, and wherein the second content NE is one of the content NEs of the second segment.

Optionally, in any of the preceding aspects, another implementation of the aspect provides that the path filter comprises one or more encrypted segment identifiers.

Optionally, in any of the preceding aspects, another implementation of the aspect provides that further comprising a memory coupled to the processor and configured to store a database of alternative paths to content NEs that are k hops away from the first content NE, wherein k is an integer value greater than or equal to 1.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
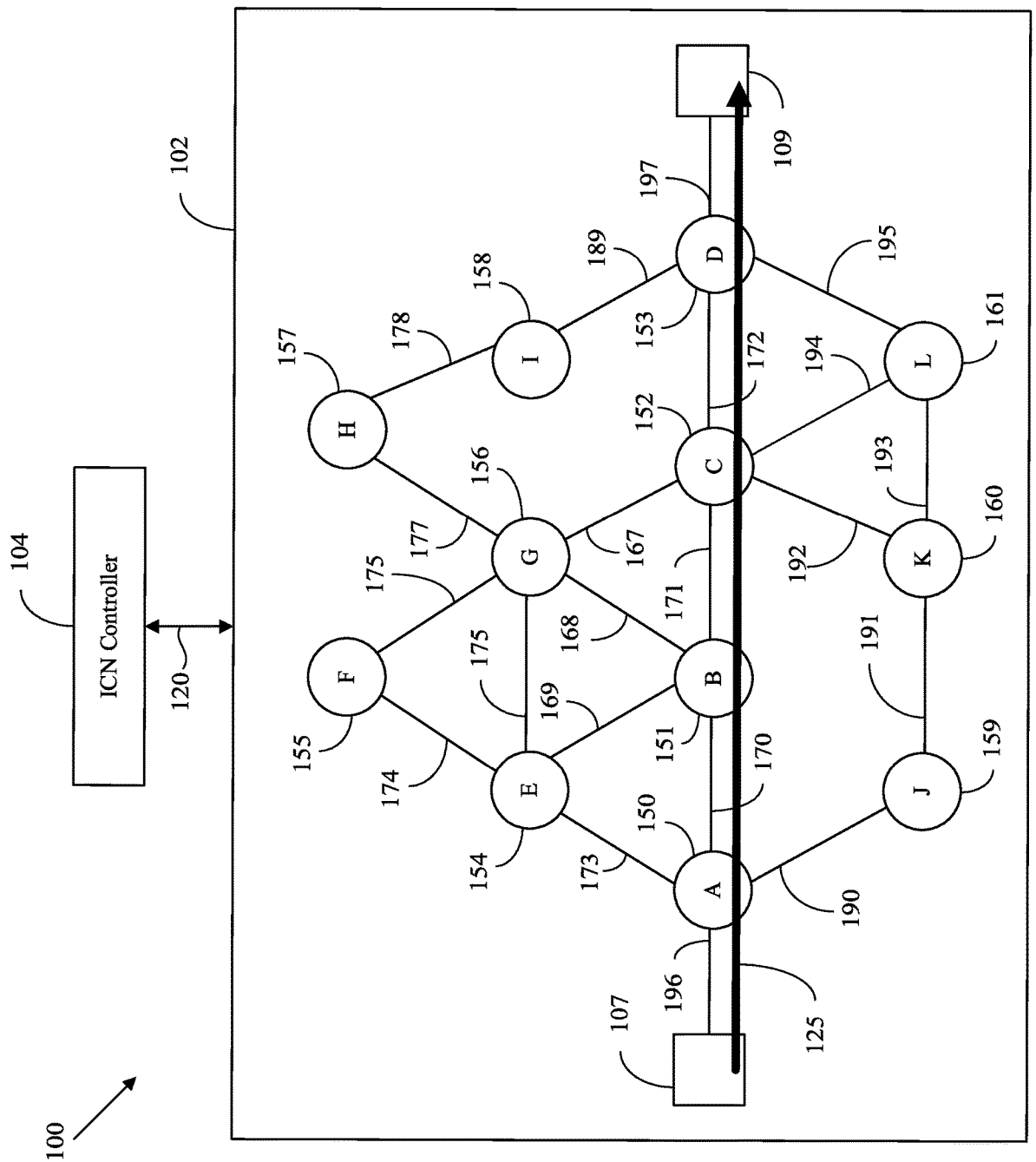
FIG. 1 illustrates an embodiment of an ICN configured to provide content as requested by a consumer.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an ICN, a consumer requests content from a producer by sending an interest packet with a name of the content requested to the producer via a path of content NEs (also referred to herein as content routers). Conventional ICNs implement stateful forwarding in which each content NE maintains a pending interest table (PIT) that stores information on the forwarded interest packets, which are then subsequently used to transport data packets with the content requested back to the consumer. However, storing a PIT of such a volume at every content NE in an ICN is an inefficient and ineffective use of network resources.

Stateless forwarding has also been introduced to eliminate the need to maintain PITs from each of the content NEs. In stateless forwarding networks, each content NE adds information regarding the previous hop to a header of the interest packet, and then transmits the interest packet to the next node on the path. In this way, the data packets with the content requested use the same header as the interest packet to transport the data packet back to the consumer.

While ICNs implementing stateless forwarding eliminate the need for each content NE to include PITs, current mechanisms for stateless forwarding do not take into account path recovery when a node, interface, or link on a path fails. Since each content NE only knows the next hop by which to transmit the data packet, the data packet has to be discarded if there is a failure along the path. In addition, content NEs in a typical stateless forwarding ICN only update interest packets to include information regarding a previous hop by which an interest packet has been received and only maintain information regarding content routers that are immediately adjacent to the current content NE.

Embodiments of the present disclosure are directed to methods and systems that facilitate secure and reliable stateless forwarding by maintaining a database of information identifying neighboring content NEs that are k hops away from a current content NE and security information for the neighboring content NE that are k hops away. A number of hops may be the number of links and/or NEs between the current content NE and the neighboring content NE. For example, k hops may be one or more hops between the current content NE and the neighboring content NE. In some embodiments, the number of hops (k) may be pre-configured at each of the content NEs such that the content NE receives and stores information identifying the neighboring content NEs that are including and within k hops from the current content NE. In addition, each content NE is configured to add segment identifiers identifying one or more interfaces and/or content NEs on a path from a consumer to a producer to the header of the interest packet. In this way, each content NE can use the segment identifier and the database of information identifying neighboring content NEs to determine a next content NE along which to transport a data packet if a failure were to occur along the path.

FIG. 1 illustrates an embodiment of an ICN 100 configured to provide content as requested by a consumer. The ICN 100 may be, but is not limited to, a Named Data Network (NDN), Content Centric Network (CCN), Content Oriented Network (CON), Data Oriented Network (DON), or Content Based Network (CBN). An ICN is a type of network architecture that focuses on information delivery. ICNs may also be known as content-aware, content-centric, or data specific networks. ICNs shift the IP communication model from a host-to-host model to an information-object-to-object model. The IP host-to-host model addresses and identifies data by storage location, for example, by host IP address, whereas the information-object-to-object model employs a non-location based addressing scheme that is content-based. The entities that are distributed or operated on in an ICN communication model are information objects. Some examples of information objects may include content, data streams, services, user entities, and/or devices. In an ICN, information objects are assigned with application-based names, which are used to address the information objects, decoupling the information objects from locations. Routing to and from the information objects are based on the assigned names. ICN provisions for in-network caching, where a wide variety of network devices or elements serve as temporary content servers. The ICN 100 may provide in-network caching, built-in content security, and multi-cast data distributions according to the ICN protocol. The ICN 100 may comprise one or more networking domains that are operated by one or more administrative entities. In one embodiment, the ICN 100 may be similar to the ICNs described in the Internet Research Task Force (IRTF) Request for Comments (RFC) 7945, entitled "Information-Centric Networking: Evaluation and Security Considerations," by K. Pentikousis, dated Sep. 6, 2016, which is hereby incorporated by reference in its entirety.

As shown in FIG. 1, ICN 100 comprises an ICN Controller 104 and a content network 102. The ICN controller 104 may be a NE that has control over a set of network resources in a control plane. For example, the ICN controller 104 may be a device, a virtual machine (VM), a hypervisor, or any other device operating in the control plane and configured to manage and/or control the routing and other management functions for content NEs A-L 150-161 within the ICN 100. In an embodiment, the ICN controller 104 maintains a synchronized record of content, security information, segment identifiers, and alternative paths hosted by different NEs in the content network 102. The ICN controller 104 may also be configured to perform ICN functionalities, such as ICN name resolution, routing, and management. In an embodiment, the ICN controller 104 is a software-defined networking (SDN) controller, such as an OpenFlow-enabled controller. In such an embodiment, the forwarding plane is decoupled from the control plane, and the ICN controller 104 configures each of the content NEs A-L 150-161 in the content network 102 with forwarding rules in the form of, for example, routing tables and/or flow tables. The ICN controller 104 may be physically or logically located within the ICN 100. In an embodiment, the ICN controller 104 may be a centralized logical entity distributed across one or more NEs. In another embodiment, the ICN controller 104 may be implemented as a network control module within a VM. It should be noted the ICN controller 104 may be coupled to one or more of the content NEs A-L 150-161 in the ICN 100.

The content network 102 may be coupled to the ICN controller 104 via a network control interface 120. While the network control interface 120 shown in FIG. 1 only depicts a link between the content network 102 and the ICN controller 104, the network control interface 120 may actually be a wired or wireless link connecting each of content NEs A-L 150-161, consumer 107, and producer 109 to the ICN controller 104. The content network 102 comprises multiple content NEs A-L 150-161, a consumer 107, and a producer 109. The consumer 107 may be a user equipment (UE), such as, for example, a mobile phone, mobile tablet, wearable device, Internet of Things (IoT) device, or personal computer. The consumer 107 may be configured to transmit interest packets requesting one or more information objects (also referred to herein as content) from a producer 109. The producer 109 may be, for example, a data center, service provider, or central office configured to provide requested content to a consumer 107. A content NE A-L 150-161 may be a physical device, such as a router or a network switch, or a logical device, configured to perform switching and routing functions in the ICN 100.

Within the content network 102, the consumer 107, producer 109, and content NEs A-L 150-161 are coupled together via interfaces 167-197. Interfaces 167-197 may include wired links or wireless links between the content NEs, input ports at the content NEs, and/or output ports at the content NEs. While only content NEs A-L 150-161 are shown as coupled together by interfaces 167-197, there may be additional content NEs between each neighboring content NE A-L 150-161. The content NEs A-L 150-161 may collaborate with each other to cache and provide content to other content NEs A-L 150-161. For example, each of the content NEs A-L 150-161 may comprise a content store, local filters, a forwarding information base (FIB), and/or other data stores configured to facilitate forwarding messages between content NEs 150-161, the consumer 107, and the producer 109. The content store may be used to cache or store content data for a period of time. The content store may also receive and associate interests (user requests for content) with corresponding content data (requested content).

The FIB may be any data structure used to associate content names with corresponding interfaces for next hops on which the interests and content data are forwarded and received. The FIB entries may indicate the next hops on which messages (interests and data) may be forwarded. The FIB may be a data structure which may be maintained and operated to process content interest and data at a data plane or forwarding plane. The data plane may comprise operations for transferring content information (interest and data) in the ICN 100, and the control plane may comprise operations related to controlling network operations during the data plane operations. The data structures above may be stored and maintained in a memory of the content NEs A-L 150-161.

To deliver content through the forwarding plane of ICN 100, the ICN controller 104 may generate and optimize forwarding rules and may identify controls based on any application, content, or domain specific objectives, such as median completion times for traffic flows or the amount of network congestion. Some examples of controls may include security verifications and enforcements, context adaptations, content caching, policy enforcements, etc. After identifying and optimizing the forwarding rules, the ICN controller 104 may generate one or more flow entries based on the optimized forwarding rules and add the flow entry to each of the content NEs A-L 150-161 along a forwarding path, for example, by sending the flow entry/entries in a flow configuration message via a network control interface 120. The network control interface 120 supports communication between the ICN controller 104 and the content NEs A-L 150-161 in the content network 102 and may employ a communication protocol and/or extend a communication protocol, such as the OpenFlow protocol.

For example, the ICN controller 104 may use a stored network topology to determine a path 125 between the consumer 107 and the producer 109. As shown in FIG. 1, the path 125 may include content NEs {A 150, B 151, C 152, D 153} between the consumer 107 and the producer 109. In an embodiment, the path 125 may include an ingress content NE, such as ingress content NE A 150, which may be the content NE that receives an interest packet from a consumer 107 and transmits a data packet to a consumer 107. In an embodiment, the path 125 may also include an egress content NE, such as egress content NE D 153, which may be the content NE sends the interest packet to the producer 109 and receives the data packet from the producer 109. This path 125 may be sent to the content NEs A-D 150-153 by the ICN controller 104 as a forwarding rule, and each of content NEs A-D 150-153 may be configured to store the forwarding rule describing path 125 in an entry of the FIB.

In an embodiment, an interest packet is sent by a consumer 107 to a producer 109 via a path 125 and is used to request an information object by name. For example, an interest packet can identify a chunk of content to retrieve by providing a name prefix and other qualifications that define what data is acceptable from the collection named by the prefix. The information object is used to supply the requested content back from the producer 109 or content NE A-L 150-161 to the consumer 107 in response to the interest packet.

In ICN 100, the consumer 107 of data transmits an interest packet over available interfaces 167-197 to any of content NEs 150-161 A-L or producer 109, which receives the interest packet and obtains the information object that matches, or satisfies, the request in the interest packet (according to the specifications in the interest packet). The content NE A-L 150-161 or producer 109 may transmit a matching information object message back to the consumer 107. The interest packet may be transmitted using broadcast or multicast facilities of the underlying transport to reach many potential sources of data with minimal bandwidth cost.

For example, when a consumer 107 creates an interest packet comprising a header and a name of content that is requested, the consumer 107 may send the interest packet to the ingress content NE A 150 via interface 196. The ingress content NE A 150 may be located at the edge of the content network 102 and is configured to receive traffic from the consumer 107. The ingress content NE A 150 may apply a longest name prefix matching (LPM) on the name in the interest packet using the FIB to determine the interface over which to transmit the interest packet. The ingress content NE A 150 may then transmit the interest packet over interface 170 to content NE B 151. Similarly, content NE B 151 may perform LPM on the name of the content requested, and transmit the interest packet over interface 171 to content NE C 152. In the same way, content NE C 152 transmits the interest packet over interface 172 to content NE D 153, and content NE D 153 may transmit the interest packet over interface 197 to the producer 109.

At any point during transmission of the interest packet along path 125, one of content NEs A-D 150-153 or producer 109 may determine that the requested content is locally stored. When the interest packet reaches a content NE A-D 150-153 or producer 109 that has the requested content, a data packet comprising the content and the content name is generated and returned back to the consumer 107 along the same path 125 traveled by the interest packet.

Typically, this return path is based on state information set up by content NEs A-D 150-153 that forwarded the corresponding interest packet. The content NEs A-D 150-153 within the ICN 100 keep both interests and data packets for a period of time. When a content NE A-D 150-153 receives multiple interest packets for the same content, the content NEs A-D 150-153 forward only the first interest packet received towards the content producer 109.

In a typical ICN, the content NEs A-D 150-153 store information of the received interest packets in a PIT for a defined period of time or until a corresponding data packet is received. An entry in the PIT comprises the requested content name, the interest packet origin (e.g., the previous hop(s)), and the forwarding direction (e.g., the next hop(s)). When the content NEs A-D 150-153 receive a data packet, the content NEs A-D 150-153 forward the data packet based on all active PIT entries for the received content. The PIT entries are removed once satisfied and the content NEs A-D 150-153 cache the received content in a content store. The content NEs A-D 150-153 may employ the content cached in the content store to satisfy any received interest packet without forwarding the interest packet.

As described above, typical ICNs implement stateful forwarding mechanisms where each content NE A-L 150-161 is configured to identify entities by hierarchical names or name prefixes (e.g., /domain/host/content) and rely on stateful name-based forwarding to pull content from the content producer. In addition, content NEs A-L 150-161 employ PITs to store interest packet information, FIBs to store outgoing interface information, and content stores to cache contents, where the PITs, the FIBs, and the content stores also store associated content names. However, the use of the PIT at each content NE A-L 150-161 is inefficient and time consuming because each content NE A-L 150-161 has to maintain the PIT to perform a lookup at the PIT every time an interest packet or a data packet is received.

Stateless forwarding has been implemented in ICNs, such as ICN 100, which eliminates the need to maintain PITs at each content NE A-L 150-161. In stateless forwarding, each content NE A-L 150-161 is configured to determine a next interface by which to forward an interest packet or a data packet based on a value in the header of the interest packet or the data packet. For example, when the ingress content NE A 150 receives an interest packet from the consumer 107, a header of the interest packet may include an identifier of the interface 196 between the consumer 107 and the ingress content NE A 150. The ingress content NE A 150 may then perform LPM on the name of the content using the FIB to determine the next interface 170 over which to forward the interest message. The ingress content NE A 150 may be configured to modify the header of the interest packet to additionally include an identifier of the interface 170 and then forward the interest packet to the content NE B 151. Content NEs B-D 151-153 are similarly configured to modify the header of the interest packet to include an identifier of the previous interface over which the interest packet is received. In this way, when the content NE D 153 forwards the interest packet to the producer 109, the producer 109 may transmit back a data packet with the same header received from content NE D 153 and the requested content. Each of the content NEs A-L 150-161 may be configured to transport the data packet along the same path that the interest packet was forwarded using the header.

However, in an ICN 100 implementing stateless forwarding, each interface 167-197 is limited to a single hop directly between two content NEs. In addition, content NEs A-L 150-161 only maintain information regarding immediately adjacent content NEs. For this reason, when a content NE or an interface fails in the ICN 100, the data packet has to be dropped. Embodiments of the present disclosure are directed to updating headers of interest packets to include segment identifiers that may identify more than one hop by which an interest packet has been received and along which to transmit an interest packet. In some embodiments, content NEs A-L 150-161 are configured to maintain information regarding neighboring content NEs A-L 150-161 that may be more than one hop away from the current content NE. In some embodiments, the content NEs A-L 150-161 are also configured to determine another path by which to transmit a data packet when a failure occurs along the path denoted in the header of the data packet using the information stored at the content NEs A-L 150-161.

In some embodiments, content NEs A-L 150-161 may still be configured to store and use PITs in forwarding interest and data packets in the ICN 100. In some embodiments, ingress content NEs, such as content NE A 150, and egress content NEs, such as content NE D 153, may still be configured to use PITs to store and determine a next hop for an interest packet and/or a corresponding data packet. In these cases, one or more of the content NEs A-L 150-161 that are configured to implement stateless forwarding of interest packets and data packets according to the embodiments disclosed herein may be configured to not use, or ignore, the relevant entries in the PIT when forwarding interest packets and data packets. For example, when an interest packet or data packet having a header with a type field indicating that the interest packet or data packet is configured to be forwarded using the stateless forwarding mechanisms described herein, content NEs A-L 150-161 may be configured to use the ICN-based segment identifiers present in the header instead of the PIT for forwarding purposes. In some embodiments, the segment identifiers may indicate segments of multiple hops or single hops, as will be further described below. In some embodiments, the segment identifiers are encapsulated using security information, such as symmetric keys, that are communicated among the content NEs A-L 150-161. In an embodiment, sharing of keys can be limited to a pair of neighboring nodes, allowing the use of unique keys over different interfaces.

Embodiments of the present disclosure provide various technical advantages. For example, content NEs A-L 150-161 that implement the stateless forwarding mechanisms described herein prevent data packets from being discarded upon a network failure (i.e., interface or node failure). The embodiments disclosed herein enable the efficient use of network resources when a network failure occurs instead of clogging the network with data packets that are merely discarded upon a network failure. The embodiments disclosed herein also provide an enhanced security layer to protect packets that are transmitted in the ICN 100. For example, encryption is performed on the segment identifiers such that only certain content NEs 150-161 have the key to decrypt the segment identifiers. For this reason, outsiders who are inspecting the packets will not be able to identify the source of the interest or data packet, or information on on-path NEs (NEs that are on the forwarding path of the interest packet) that are multiple hops away.

Figure 2:
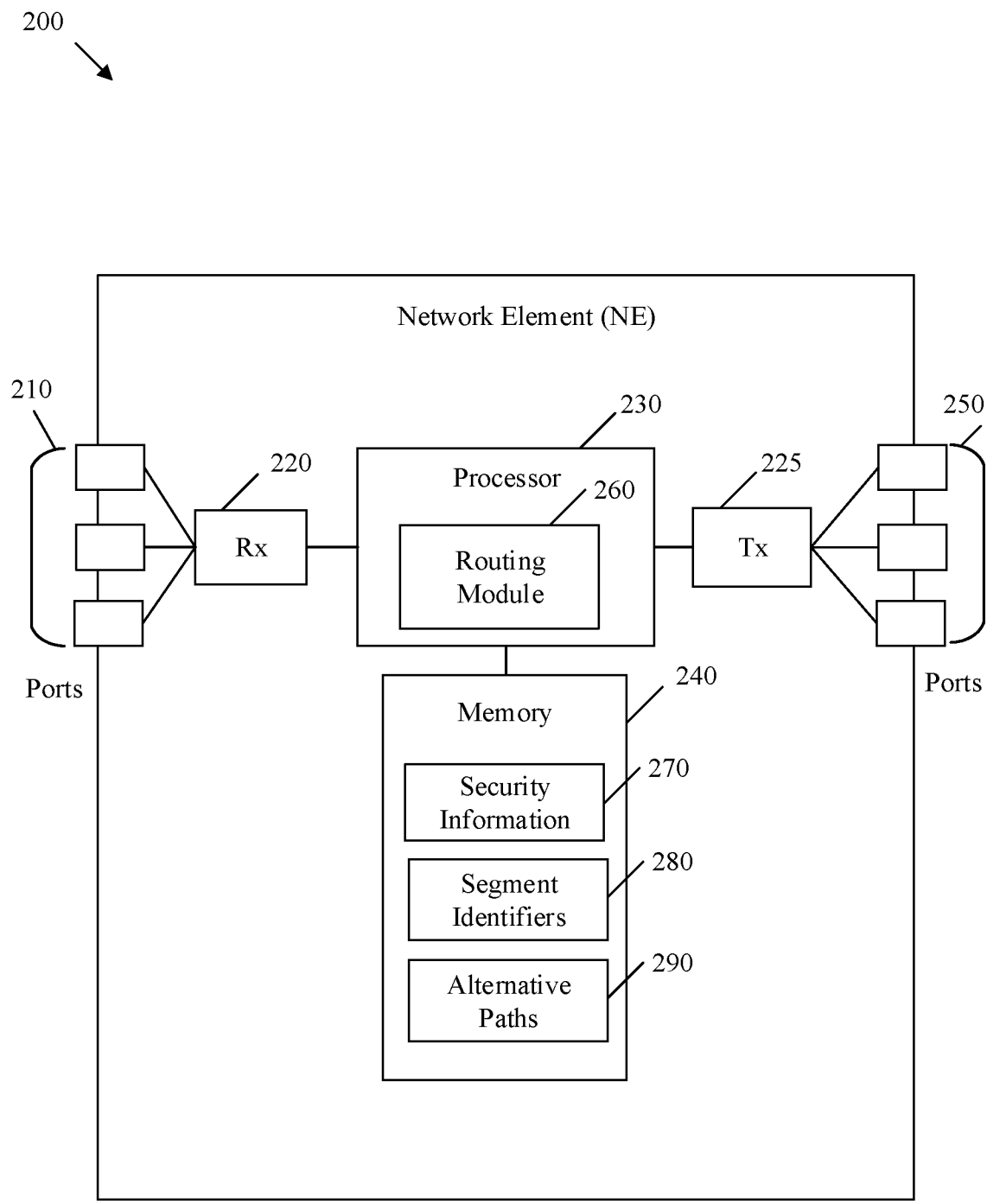
FIG. 2 is a diagram of an embodiment of a network element (NE) in an ICN.

FIG. 2 is a diagram of an embodiment of an NE 200 in an ICN 100. NE 200 may be implemented as the ICN controller 104, content NEs A-L 150-161, consumer 107, or producer 109. The NE 200 may be configured to implement and/or support the routing mechanisms described herein. The NE 200 may be implemented in a single node or the functionality of NE 200 may be implemented in a plurality of nodes. One skilled in the art will recognize that the term NE encompasses a broad range of devices of which NE 200 is merely an example. The NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as a NE 200. For instance, the features and/or methods in the disclosure may be implemented using hardware, firmware, and/or software installed to run on hardware. As shown in FIG. 2, the NE 200 comprises one or more ingress ports 210 and a receiver unit (Rx) 220 for receiving data, at least one processor, logic unit, or central processing unit (CPU) 230 to process the data, transmitter unit (Tx) 225 and one or more egress ports 250 for transmitting the data, and a memory 240 for storing the data.

The processor 230 may comprise one or more multi-core processors and be coupled to a memory 240, which may function as data stores, buffers, etc. The processor 230 may be implemented as a general processor or may be part of one or more application specific integrated circuits (ASICs) and/or digital signal processors (DSPs). The processor 230 may comprise a routing module 260, which may perform processing functions of the content NEs A-L 150-161, as discussed more fully below. The routing module 260 may also be configured to perform the steps of methods 700, 800, and 900, and/or any other method discussed herein. As such, the inclusion of the routing module 260 and associated methods and systems provide improvements to the functionality of the NE 200. Further, the routing module 260 effects a transformation of a particular article (e.g., the network) to a different state. In an alternative embodiment, routing module 260 may be implemented as instructions stored in the memory 240, which may be executed by the processor 230.

The memory 240 may comprise a cache for temporarily storing content, e.g., a random-access memory (RAM). Additionally, the memory 240 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 240 may be configured to store security information 270, segment identifiers 280, and alternative paths 290. Security information 270 may comprise the keys used to encrypt or decrypt segment identifiers 280 that are sent to or received from neighboring content NEs A-L 150-161. Segment identifiers 180 may comprise identifiers that uniquely identify a segment of one or more content NEs A-L 150-161 and interfaces 167-197. Alternative paths 290 may comprise alternative paths from a content NE A-L 150-161 to another content NE A-L 150-161, consumer 107, or producer 109.

It is understood that by programming and/or loading executable instructions onto the NE 200, at least one of the processor 230 and/or memory 240 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

Figure 3:
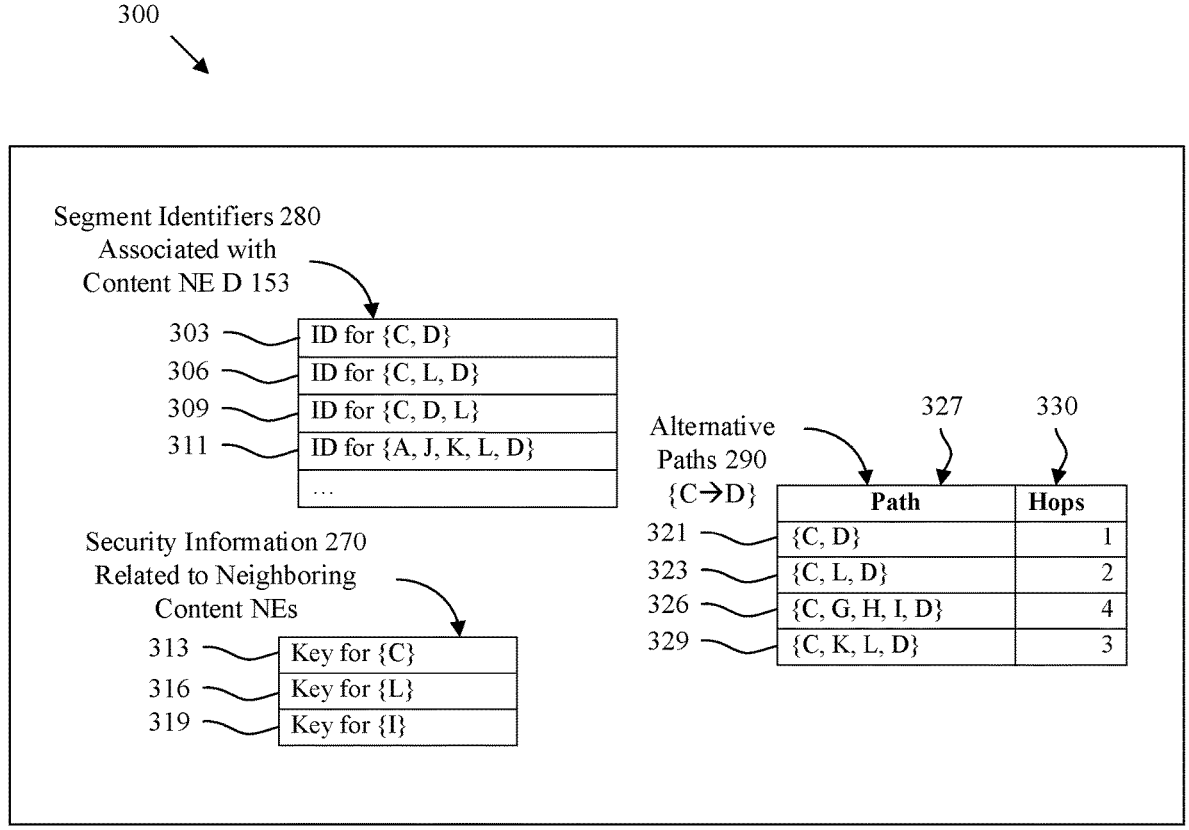
FIG. 3 illustrates an embodiment of information that may be stored at a content NE 150-161.

FIG. 3 illustrates an embodiment of information 300 that may be stored at a content NE A-L 150-161. For example, the information 300 represents a portion of the data that may be stored at a memory 240 of content NE D 153. The information 300 includes, for example, segment identifiers 280 of segments that are associated with content NE D 153, security information 270 related to content NEs neighboring content NE D 153, and alternative paths 290 from content NE D 153 to content NE C 152. While the information 300 shown in FIG. 3 is shown as tables, it should be appreciated that the information 300 shown in FIG. 3 may be stored as any type of data structure. Similarly, while information 300 shown in FIG. 3 only shows data related to content NE D 153, it should be appreciated that each of the content NEs A-L 150-161 may store similar information comprising data related to that particular content NE A-L 150-161.

As shown in FIG. 3, the information 300 includes segment identifiers 280 associated with content NE D 153. A segment identifier 280 refers to an identifier that uniquely identifies a segment of continuous content NEs A-L 150-161 and connecting interfaces 167-197 within an ICN 100. A segment refers to one or more consecutive interfaces 167-197 connecting one or more content NEs A-L 150-161 in the ICN 100. A segment identifier 280 is associated with a content NE A-L 150-161 when the content NE is one of the nodes of the segment identified by the segment identifier 280. In an embodiment, a segment identifier 280 is associated with a content NE A-L 150-161 when the content NE is an endpoint of the segment identified by the segment identifier 280. In an embodiment, a segment identifier 280 is a dynamic identifier set by a content NE.

Information 300 may include the database representing segment identifiers 280, which may store segment identifiers 280 for segments associated with content NE D 153. For example, entry 303 shows that a segment identifier 280 for the segment connecting content NE C 152 and content NE D 153 via interface 172 is stored at the content NE D 153. Similarly, entry 306 shows that a segment identifier 280 for the segment connecting content NE C 152, content NE L 161, and content NE D 153 via interfaces 195 and 194 is stored at the content NE D 153. Entry 309 shows that a segment identifier 280 for the segment connecting content NE C 152, content NE D 153, and content NE L 161 via interfaces 172 and 195 is stored at the content NE D 153. Similarly, entry 311 shows a segment identifier 280 for the segment connecting content NE A 150, content NE J 159, content NE K 160, content NE L 161, and content NE D 153 via interfaces 190, 191, 193, and 195 is stored at the content NE D 153.

In this way, the information 300 may include segment identifiers of a segment connecting any number of content NEs A-L 150-161, with end nodes of the segment being one or multiple hops away from each other on the default path. While the table representing the segment identifiers 280 associated with content NE D 153 shows only four of the segment identifiers 280 associated with content NE D 153, the information 300 includes as many segment identifiers 280 for segments associated with content NE D 153 as permitted. For example, an administrator of ICN 100 may preset a maximum number of segment identifiers 280 that may be stored at each content NE A-L 150-161. In one embodiment, the number of segment identifiers 280 stored at a content NE A-L 150-161 may be limited by a maximum number of hops, for which the limit can be imposed separately or jointly for the default and alternative paths. For example, the content NE D 153 may be configured to store segment identifiers 280 that are less than or equal to three hops away from the content NE D 153. In this case, information 300 may not include the identifier for the segment connecting content NE A 150, content NE J 159, content NE K 160, content NE L 161, and content NE D 153 via interfaces 190, 191, 193, and 195, as the end nodes for the given segment are four hops away.

Information 300 may include the database representing the security information 270 related to neighboring content NEs, which may include a key for content NE C 152 shown at entry 313, a key for content NE L 161 shown at entry 316, and a key for content NE I 158 shown at entry 319 because these are the content NEs that neighbor content NE D 153. In an embodiment, key exchanges can cover multiple hops rather than being limited to a single hop neighborhood based on the security considerations and trust among network nodes, for which the limit can be set, for instance, using a scope parameter as determined by the network administrator. In an embodiment, each content NE 150-161 is configured to transmit a key of the content NE to neighboring content NEs A-L 150-161. For example, content NE D 153 may send a key of content NE D 153 to content NE C 152, content NE L 161, and content NE I 158. Similarly, content NE D 153 has keys for each of the neighboring content NEs, content NE C 152, content NE L 161, and content NE I 158. A key for a content NE may be a variable value that is applied to a segment identifier 280 to encrypt or decrypt that segment identifier 280. In this way, neighboring content NEs may be able to perform encryption and decryption on segment identifiers 280 received from neighboring content NEs using the key of the neighboring content NE, as will be further described below.

In one embodiment, the security information 270 may be symmetric keys shared among neighboring content NEs 150-161 or shared among neighboring content NEs 150-161 that are multiple hops away. When a symmetric key is used to encrypt a segment identifier 280 at a content NE when sending an interest packet, that same symmetric key is used to decrypt the segment identifier 280 at another content NE when receiving a data packet. In some embodiments, each content NE 150-161 may send a symmetric key to one or more neighboring content NEs. The neighboring content NEs may be more than one hop away. The neighboring content NEs may securely store the symmetric key in association with an identifier of the content NE 150-161 that sent the symmetric key. In this way, when a neighboring content NE receives a data packet comprising a segment identifier 280 that has been encrypted using a symmetric key of the content NE 150-161, the neighboring content NE may retrieve the symmetric key from storage and then decrypt the segment identifier 280 using the symmetric key.

Information 300 may include the database representing the alternative paths 290 from content NE C 152 to content NE D 153, which may include one or more paths from content NE C 152 to content NE D 153 in column 327. In one embodiment, information 300 may also include the number of hops on each path in column 330, or any other path cost-related metric. The path from content NE C 152 to content NE D 153, which may be across one hop assuming there are no other nodes present between content NE C 152 to content NE D 153, may be stored in the alternative paths 290 at entry 321. Entry 323 shows an alternative path 290 from content NE C 152, to content NE L 161, to content NE D 153. Assuming there are no other nodes on interface 194 between content NE C 152 and content NE L 161, and no other nodes on interface 195 between content NE L 161 and content NE D 153, this alternative path 290 may include two hops. Entry 326 shows an alternative path 290 from content NE C 152, to content NE G 156, to content NE H 157, to content NE I 158, to content NE D 153. Assuming there are no other nodes on interfaces 167, 177, 178, and 190 between the content NEs on this alternative path 290, there may be four hops on this alternative path 290. Entry 329 shows an alternative path 290 from content NE C 152, to content NE K 160, to content NE L 161, to content NE D 153. Assuming there are no other nodes on interfaces 192, 193, and 195, between the content NEs on this alternative path 290, there may be three hops on this alternative path 290.

In some embodiments, information 300 may include alternative paths 290 from a current content NE that are k hops away. A number of hops may be the number of links and/or NEs between the current content NE and the neighboring content NE. For example, k hops may be one or more hops between the current content NE and the neighboring content NE. In some embodiments, the number of hops (k) may be pre-configured at each of the content NEs such that the content NE receives and stores information identifying the neighboring content NEs. In one embodiment, the number of hops in an alternative path 290 may be limited to the pre-configured number of hops (k). For example, the content NE D 153 may be configured to store alternative paths 290 from content NE C 152 to content NE D 153 that have a maximum of three hops, such that k is equal to three at the content NE D 153. In this case, the alternative path 290 shown in entry 326 would be excluded from information 300 because the number of hops on the alternative path 290 shown in entry 326 exceeds the maximum number of hops permitted.

Figure 4:
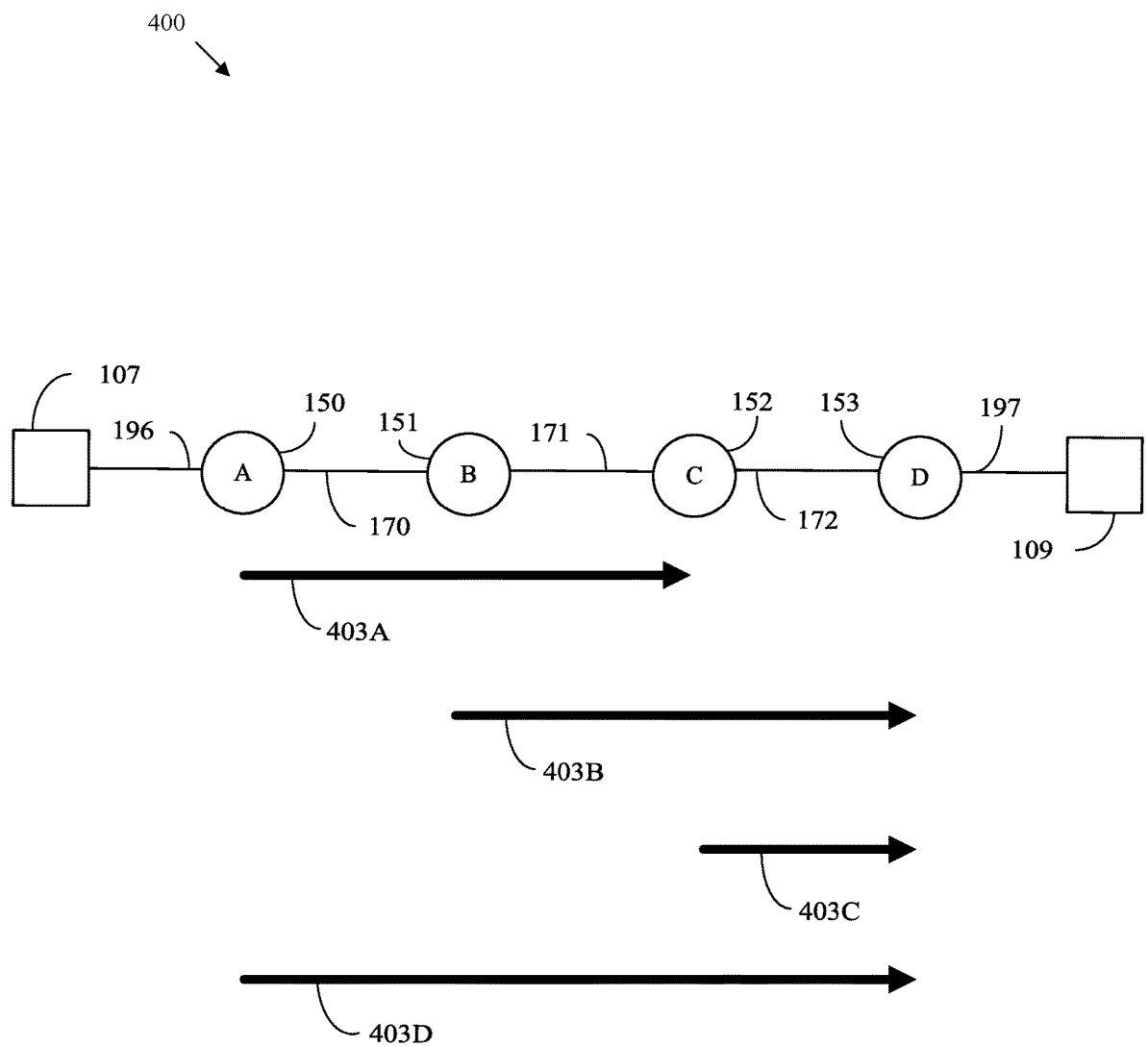
FIG. 4 shows segments of a portion of the ICN according to various embodiments of the disclosure.

FIG. 4 shows segments 403 of a portion 400 of the ICN 100 according to various embodiments of the disclosure. The portion 400 of the ICN 100 shown in FIG. 4 includes the consumer 107, content NE A 150, content NE B 151, content NE C 152, content NE D 153, and the producer 109. Interface 196 connects the producer 107 to content NE A 150, interface 170 connects content NE A 150 and content NE B 151, interface 171 connects content NE B 151 and content NE C 152, interface 172 connects content NE C 152 to content NE D 153, and interface 197 connects content NE D 153 to the producer 109. Interface 196 and 197 may include additional content NEs, edge routers, switches, or other nodes. Interface 196 and 197 may also include additional domains similar to ICN 100. Interfaces 170-172 may include additional nodes in between each of the content NEs.

As shown in FIG. 4, there may be multiple segments 403 between the consumer 107 and the producer 109. For example, segment 403A includes content NE A 150, interface 170, content NE B 151, interface 171, and content NE C 152. In this way, segment 403A couples three consecutive NEs A-C 150-152 via interfaces 170-171, respectively, on path 125. Segment 403B includes content NE B 151, interface 171, content NE C 152, interface 172, and content NE D 153. In this way, segment 403B also couples three consecutive NEs B-D 151-153 via interfaces 171-172, respectively, on path 125. Segment 403C includes content NE C 152, interface 172, and content NE D 153. In this way, segment 403C couples two consecutive NEs content NE C 152 and content NE D 153 via interface 172 on path 125. Segment 403D includes content NE A 150, interface 170, content NE B 151, interface 171, content NE C 152, interface 172, and content NE D 153. In this way, segment 403C couples four consecutive NEs on path 125.

Neighboring content NEs A-L 150-161 may be configured to send each other path metrics, such as identifiers of the specific content NE A-L 150-161, identifiers of the interfaces 167-197 connecting to the content NE A-L 150-161, and/or any other information that may be relevant to the content NE A-L 150-161. Such path metrics may be used to translate segment identifiers 280 along the ICN 100. For example, suppose that for a path between content NE A 150, to content NE B 151, and to content NE C 152, a previous next hop set is identified as the following tuple {A, C}. In a typical ICN, the size of a set of paths, corresponding to two hop length segments including a content NE, would be determined by $O(n_i^2)$, where $n_i$ represents the number of interfaces at each content NE A-L 150-161, each of which may be represented with $O(\log n_i)$ bits. To enable secure communication within the network, encrypted segment identifiers might be used, in which case, content NE B 151 may receive metrics from all neighboring content NEs, such as content NE A 150 and content NE C 152, resulting in a filter storage overhead of $\theta(n_i^3 \log n_i)$, which can become a limiting factor due to storage size requirements.

In an embodiment, the overhead may be reduced by explicitly using assigned segment identifiers 280 for hops instead of path metrics of neighboring content NEs A-L 150-161 that have to be stored. For example, a segment identifier 280 uniquely identifies a segment of one or more content NEs A-L 150-161 connected by one more interfaces 167-197, and the segment identifier 280 may be previously assigned by, for example, an administrator of ICN 100. Further, each content NE A-L 150-161 may be assigned a unique identifier that identifies the content NE A-L 150-161. In one embodiment, each content NE A-L 150-161 transmits the identifier of the content NE A-L 150-161 to neighboring content NEs A-L 150-161. The identifier of the content NE A-L 150-161 may be used to generate the segment identifier 280 in a manner that is easily understood across all content NEs A-L 150-161 in the ICN 100. For example, assuming content NE A 150 has an identifier of A, content NE B 151 has an identifier of B, and content NE C 152 has an identifier of C. In this case, a segment identifier 280 for the segment 403A may be formed using each of the identifiers of each of the content NEs of the segment 403A. For example, the segment identifier 280 for the segment 403A may be a concatenation of all of the identifiers of each of the content NEs of segment 403A, resulting in a segment identifier of ABC. As another illustrative example, the segment identifier for the segment 403A may include identifiers of content NEs that are endpoints of segment 403A, resulting in a segment identifier of AC, which may offer more flexibility in routing data packets as the segment end point (for instance, content NE C 152) can choose the best path towards reaching the other end point (for instance, content NE A 150).

In this way, each content NE A-L 150-161 is configured to use the stored identifiers of each of the neighboring content NEs to translate a segment identifier 280 into a chain of content NEs A-L 150-161. In addition, each neighboring content NE A-L 150-161 is configured to use the identifier of the content NE and a received segment identifier 280 to determine a next hop by which to forward a data packet, as will be further described below. In an embodiment, identifier type (e.g., content NE identifier, e.g., A, incremental segment identifier, e.g., ABC, or compressed segment identifier, e.g., AC) can be versioned and included as part of the header. In an embodiment, to reduce the size requirements for a content NE identifier, with careful planning to ensure forwarding correctness, content NE identifiers can be reused within non-overlapping neighborhoods.

In one embodiment, each content NE A-L 150-161 is configured to insert a segment identifier 280 onto an interest packet sent from a consumer 107 to a producer 109. For example, when content NE A 150 receives an interest packet from consumer 107 over interface 196, content NE A 150 may add a segment identifier 280 of the segment between the consumer 107 and content NE A 150. In an embodiment, content NE A 150 can add a segment identifier 280 of the segment between the consumer 107 and the next hop for content NE A 150 for the received interest packet, which, for example, can be content NE B 151. In this way, each content NE A-L 150-161 is configured to add a segment identifier 280 of a previous segment 403, or one including the previous segment 403, over which the interest packet is received and or forwarded. In one embodiment, a content NE A-L 150-161 is configured to encrypt the segment identifier 280 using the security information 270 of a content NE A-L 150-161 to which the interest packet is forwarded. For example, content NE A 150 may encrypt the segment identifier 280 using a key of content NE B 151 and then update the interest packet using the encrypted segment identifier 280. In this way, scope of access to segment identifiers included within ICN packets can be limited and outsiders may not be able to determine a source or destination of the interest packet. In one embodiment, a content NE may replace an existing segment identifier within an interest packet corresponding to a segment that is k-hops long with a new segment identifier that is k+1 hops long. In another embodiment, the updated segment identifier to replace an existing one within the interest packet is encrypted.

Figure 5:
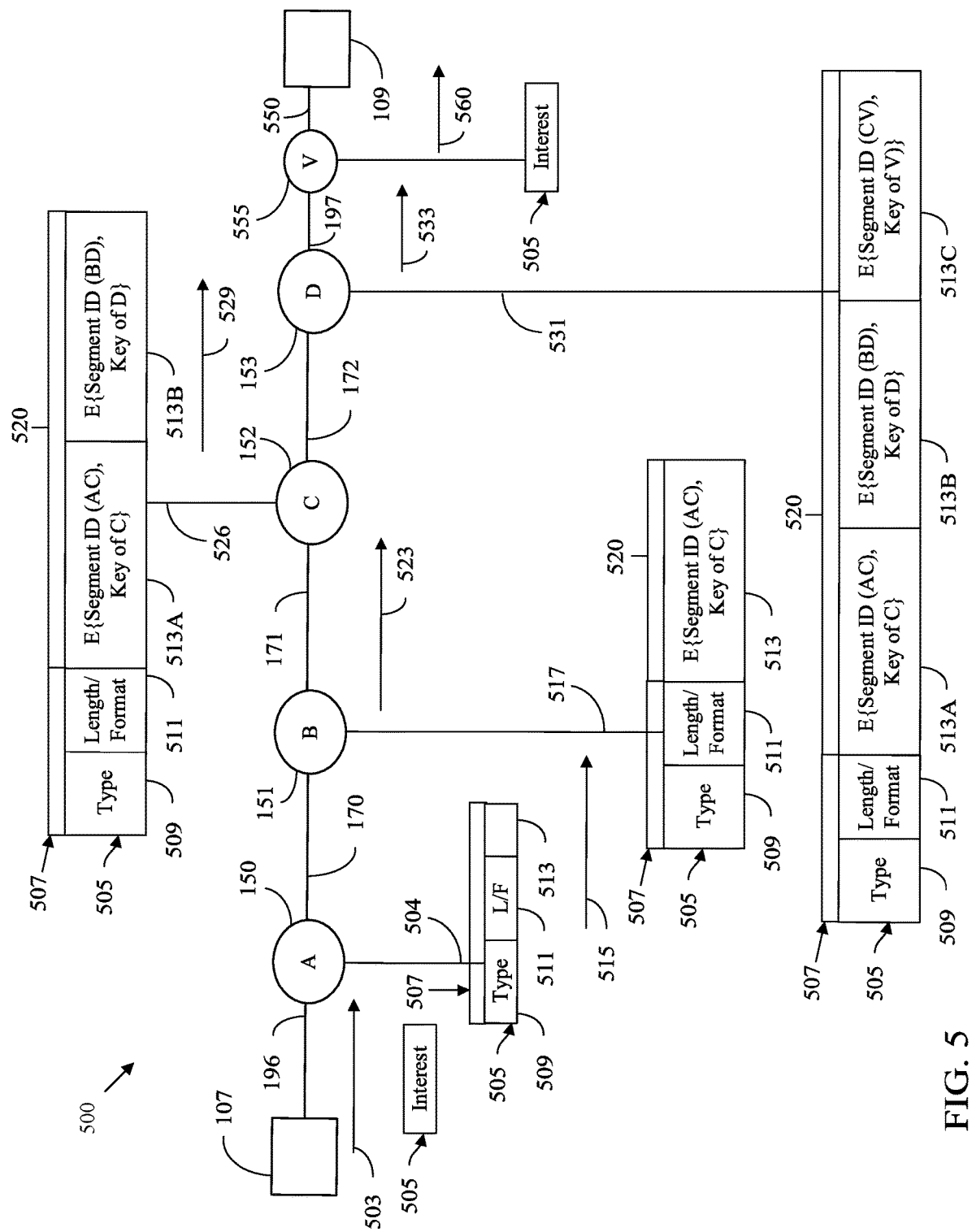
FIG. 5 is a diagram illustrating a method of transmitting an interest packet between a consumer and a producer in the ICN.

FIG. 5 is a diagram illustrating a method 500 of transmitting an interest packet 505 carrying encrypted segment identifiers between a consumer 107 and a producer 109 in an ICN. The ICN shown in FIG. 5 is similar to ICN 100, except that the ICN shown in FIG. 5 additionally includes content NE V 555. In an embodiment, content NE V 555 is similar to content NEs A-L 150-161, except that content NE V 555 may be configured as an egress content NE that stores the path filter for a particular interest packet 505.

In an embodiment, the path filter comprises the segment identifiers 280 for a path 125 and may be added as an optional header on a corresponding data packet, which will be further described below with reference to FIG. 6. In one embodiment, the term path filter may refer to an aggregation of one or more segment identifiers 280 along a path 125 between a consumer 107 and a producer 109. In some embodiments, one or more content NEs along a path 125 are configured to add additional segment identifiers 280, which may be encrypted, to the path filter to create the modified path filter. For example, the path filter is modified each time a content NE adds one or more segment identifiers 280 to the path filter field of an interest packet or a data packet.

Method 500 is implemented by the consumer 107, content NEs A-D 150-153, content NE V 555, and producer 109. Method 500 may be implemented when a consumer 107 initiates an interest packet 505 requesting content by a name of the content. While only five content NEs A-D and V 150-153 and 555 are shown in FIG. 5, it should be appreciated that method 500 may be performed across any number of content NEs A-L 150-161 and V 555.

At step 503, the consumer 107 generates an interest packet 505 comprising a name of content requested and then transmits the interest packet 505 to the ingress content NE A 150. After receiving the interest packet 505 from the consumer 107, content NE A 150 is configured to determine a next interface or next content NE to transmit the interest packet 505. For example, content NE A 150 may perform LPM on the name of the content requested in the interest packet 505 using the FIB to determine a next interface over which to transmit the interest packet 505. For example, the FIB may comprise entries received from the ICN controller 104 that govern how each content NE A-L 150-161 determines a next interface or next content NE to transmit an interest packet 505. In an embodiment, interest packet 505 and header 507 may be similar to the interest packets and headers described in the IRTF draft document entitled "CCNx Messages in TLV Format," by M. Mosko, dated Oct. 29, 2017, which is hereby incorporated by reference in its entirety.

At step 504, once content NE A 150 has determined the next interface 170 and/or next content NE B 151 to transmit the interest packet 505, content NE A 150 updates the interest packet 505 to include a header 507, thereby creating a stateless-forwarded interest packet 505. Here, a stateless-forwarded interest packet 505 can refer to an interest packet that is forwarded without creating a corresponding PIT entry at content NEs but instead creating an in-packet path filter within interest packets which is used to forward data packets. In an embodiment, the header 507 of the stateless-forwarded interest packet 505 may include a type field 509 (for instance, a stateless interest), a format or length field 511 (depending on the implementation), and a packet filter field 513. While only these fields of the header 507 are shown in FIG. 5, it should be appreciated that header 507 may include additional fields that are not shown in FIG. 5. In addition, while FIG. 5 only shows the header 507 of the stateless-forwarded interest packet 505, it should be appreciated that the stateless-forwarded interest packet 505 may include additional headers, such as outer headers and inner headers.

In an embodiment, the type field 509 may comprise, for example, multiple sub-components indicating that this stateless-forwarded interest packet 505 includes segment identifiers 280 or encrypted segment identifiers 280 in a packet filter field 513, and/or the format used to create the segment identifiers. In an embodiment, the format or length field 511 may comprise a format or length of the stateless-forwarded interest packet 505. The packet filter field 513 is intended to comprise the one or more path filters for the path 125. The one or more path filters comprises one or more segment identifiers 280 or encrypted segment identifiers 280 that together form a modified path filter 520, where the segment identifiers can each consists of multiple subfields indicating the format and length of the segment identifier in the case of variable length identifiers, corresponding to for instance variable length segments.

In this case, when ingress content NE A 150 receives the interest packet 505 from the consumer 107, the ingress content NE A 150 may obtain an identifier of the interface 196 between the consumer 107 and the ingress content NE A 150. However, the ingress content NE A 150 may not need to insert any information regarding interface 196 into the packet filter field 513 because the ingress content NE A 150 is configured to maintain a table that identifies all interfaces that connect the ingress content NE A 150 to consumer 107 and producer 109. For instance, an existing PIT can be used to store such information. Therefore, the packet filter field 513 can remain blank, or empty, when ingress content NE A 150 updates the interest packet 505. Content NE A 150 can also insert an identifier identifying itself before forwarding the request to the next hop. In an embodiment, the payload of the interest packet may comprise the name of the requested content. The name may comprise a hierarchical sequence of name components and describe a particular content item(s) within the ICN 100. For instance, in cases where the lookup on content name produces a locator identifier, original interest packet can be encapsulated using the proposed header format while including locator within this new header for forwarding lookup at the subsequent content NEs on the interest path.

At step 515, the ingress content NE A 150 transmits the stateless-forwarded interest packet 505 to content NE B 151 via interface 170. After content NE B 151 receives the stateless-forwarded interest packet 505, content NE B 151 performs steps similar to those which content NE A 150 performs to identify the next interface 171 and/or next content NE C 152 to transmit the stateless-forwarded interest packet 505. For example, content NE B 151 uses the name of the requested content to determine that the stateless-forwarded interest packet 505 is to be transmitted to content NE C 152 via interface 171.

At step 517, content NE B 151 is configured to determine a modified path filter 520 to insert into the path filter field 513. In an embodiment, the modified path filter 520 includes one or more segment identifiers 280 or one or more encrypted segment identifiers 280 that identify one or more previous content NEs or one or more next content NEs on the path 125 that the stateless-forwarded interest packet 505 travels between a consumer 107 and a producer 109 or between a consumer 107 and a content NE that stores the requested content. In an embodiment, content NE B 151 may obtain a segment identifier 280 that identifies a segment 403 over which the stateless-forwarded interest packet 505 was received and/or over which the stateless-forwarded interest packet 505 is to be transmitted.

For example, content NE B 151 may determine that the stateless-forwarded interest packet 505 is to be transmitted to content NE C 152. In this case, content NE B 151 may determine a modified path filter 520 by determining a segment identifier 280 for a segment 403 that is associated with, or includes both content NE B 151 and content NE C 152. In some embodiments, the path filter may be modified to include a segment identifier 280 that identifies one or more previous content NEs or one or more next content NEs on the path. For example, the previous content NE may be any content NE between the consumer 107 and the current content NE, content NE B 151. The next content NE may be any content NE between the current content NE, content NE B 151, and the producer 109. As shown in FIG. 5, content NE B 151 may determine a segment identifier 280 for a segment 403A connecting the previous content NE, content NE A 150, and the next content NE, content NE C 152 via content NE B 151. It should be appreciated that content NE B 151 may determine other segment identifiers 280 that are also associated with content NE B 151 and content NE C 152. For example, content NE B 151 may determine a segment identifier 280 for a segment 403 connecting content NE B 151 to content NE D 153 via content NE C 152, as content NE B 151 has access to further forwarding information associated with the content name included within the interest packet 505, and any other parameters required to create the segment identifiers 280. Once the segment identifier 280 for the segment that is associated with content NE B 151 and content NE C 152 is determined, content NE B 151 may insert the segment identifier 280 into the path filter field 513.

In an embodiment, content NE B 151 may be configured to encrypt the determined segment identifier 280 using security information 270 related to the next content NE C 152. For example, content NE B 151 may be configured to encrypt the determined segment identifier 280 using the key previously received from content NE C 152 (and/or shared with it) and then insert the encrypted segment identifier 280 into the path filter field 313. In this way, content NE C 152 is capable of decrypting and determining the segment identifier 280 in the path filter field 513 while other nodes are incapable of doing the same, thus preventing observers of the interest packet 505 from identifying the consumer 107 of the interest packet 505.

In some embodiments, the modified path filter 520 may carry a combination of encrypted and non-encrypted segment identifiers 280, with the encryption status of each segment identifier 280 within the path filter field 513 being signaled using a single-bit flag integrated with each segment identifier 280. In some embodiments, when the segment identifiers 280 are not constant sized, then type-length subfields associated with each of the separate segment identifiers 280 in the path filter field 513 may be used to carry the size of the respective segment identifier 280. In which case, the single-bit flag may be integrated directly within the type subfield (as an encrypted segment identifier 280 or a non-encrypted segment identifier 280). An example of such a format would be list the Type, Length/Format, E{Segment ID(AC), Key of C}, Content Requested, where E{Segment ID(AC), Key of C} can be expanded as {Type: Encrypted Segment Identifier; Length: number of Bytes/bits (implementation specific); Value: Segment Identifier AC}.

At step 523, the content NE B 151 transmits the stateless-forwarded interest packet 505 to content NE C 152 via interface 171. After content NE C 152 receives the stateless-forwarded interest packet 505, content NE C 152 performs steps similar to those which content NE A 150 and content NE B 151 perform to identify the next interface and/or the next content NE to which to transmit the stateless-forwarded interest packet 505. For example, content NE C 152 determines, using the FIB, that the stateless-forwarded interest packet 505 should be transmitted to content NE D 153 via interface 172.

At step 526, content NE C 152 is configured to modify the path filter 520 to insert another segment identifier 280 or an encrypted segment identifier 280 into the path filter field 513. For example, when content NE C 152 receives the stateless-forwarded interest packet 505, the modified path filter 520 includes a first path filter associated with a first segment identifier 280 identifying a segment 403A in the first path filter field 513A. After determining that the stateless-forwarded interest packet 505 is to be forwarded to content NE D 153, content NE C 152 may be configured to determine a second path filter by determining a segment identifier 280 for a segment 403 associated with, or including both content NE C 152 and the next content NE, content NE D 153. As shown in FIG. 5, content NE C 152 may determine a segment identifier 280 for a segment 403B connecting the previous content NE, content NE B 151, the current content NE, content NE C 152, and the next content NE, content NE D 153 via interfaces 171 and 172. This segment identifier 280 may become a second path filter that is included in the second path filter field 513B. In one embodiment, the second path filter field 513B includes the segment identifier 280 for segment 403B. In an embodiment, the second path filter field 513B includes an encrypted segment identifier 280 that is encrypted using security information 270 of content NE D 153. The modified path filter 520 refers to the concatenation of the first path filter shown in the first path filter field 513A and the second path filter shown in the second path filter field 513B. In an embodiment, NE C 152 may combine 513A and 513B by replacing segment identifier 513A with segment identifier 280 corresponding to segment 403D, keeping the number of segment identifiers included within the path filter the same.

At step 529, the content NE C 152 transmits the stateless-forwarded interest packet 505 to content NE D 153. After content NE D 153 receives the stateless-forwarded interest packet 505, content NE D 153 performs steps similar to those which content NE A 150, content NE B 151, and content NE C 152 perform to identify the next interface, the next content NE, or the next producer 109 to which to transmit the stateless-forwarded interest packet 505. Although FIG. 5 shows content NE D 153 as the egress content NE D 153 that sends interest packets to and receives data packets from the producer 109, it should be appreciated that other egress content NEs, egress nodes, and/or domains may be present between content NE D 153 and producer 109.

In FIG. 5, content NE D 153 determines that the stateless-forwarded interest packet 505 should be transmitted to the content NE V 555 via interface 550. At step 531, content NE D 153 is configured to modify the path filter 520 to insert another segment identifier 280 or into the path filter field 513. In an embodiment, content NE D 153 may be configured to determine a segment identifier 280 that is associated with, or includes content NE D 153. In such a case, as shown in FIG. 5, content NE D 153 is configured to add a third path filter including a segment identifier 280 identifying a segment from the previous content NE, content NE C 152 to the next content NE, content NE V 555 in the third path filter field 513C. As shown in FIG. 5, the third path filter is added to the modified path filter 520. However, in another embodiment, the third path filter may completely replace the second path filter in the path filter field 513B, for instance, with one corresponding to segment from content NE B 151 to content NE V 555. Similarly, in another embodiment if sufficient information is available at content NE D 153 to retrieve the information on nodes associated with the earlier segment identifiers (for instance, through decryption), then the third path filter 513C may completely replace both the first and the second path filters in the path filter fields 513A and 513B, for instance with one corresponding to segment from content NE A 150 to content NE V 555. One advantage of such path filter replacements is that it can offer better flexibility in supporting the use of asynchronous paths on routes with differing quality measures along forward (uplink) and reverse (downlink) directions.

In an embodiment, egress content NE D 153 may be configured to determine an identifier of the interface 550 in between content NE D 153 and content NE V 555. For example, the identifier of the interface 550 may be an identifier of a port on the content NE D 153 that is used to communicate with the content NE V 555. In this case, content NE D 153 is configured to add a third path filter comprising an identifier of the interface 550 between the content NE D 153 and content NE V 555 in the third path filter field 513C. In an embodiment, egress content NE D 153 may be configured to obtain the identifier of the egress content NE D 153 and add this content NE identifier to the third path filter field 513C. In an embodiment, content NE D 153 can replace the one or more of the earlier segment identifiers with a segment identifier terminating at NE D 153 before inserting the segment identifier (or node identifier in this case as represents information on a single hop) for link between NE D 153 and NE V 555. The modified path filter 520 refers to the aggregation of the first path filter shown in the first path filter field 513A, the second path filter shown in the second path filter field 513B, and the third path filter shown in the third path filter field 513C.

At step 533, content NE D 153 transmits the stateless-forwarded interest packet 505 to the content NE V 555. In some embodiments, the content NE V 555 is the egress content NE that communicates directly with the producer 109. In an embodiment, the content NE V 555 may be an edge node that communicates with another network. In both of these cases, content NE V 555 is configured to receive the modified path filter 520 from the header 507. In one embodiment, content NE V 555 may be configured to store the modified path filter 520 for the interest packet 505 in a memory, such as memory 240. For example, the modified path filter 520 may be stored locally at the content NE V 555 in association with the content requested, an identifier of the consumer 107, and/or an identifier of any of the content NEs on the path 125. In one embodiment, the modified path filter 520 may be stored in the local PIT of the content NE V 555.

In one embodiment, content NE V 555 may be configured to remove the header 507 from the interest packet 505 such that the modified path filter 520 is not sent to the producer 109. In one embodiment, content NE V 555 may be configured to transmit the interest packet 505 with the modified path filter 520 in the header 507. In an embodiment, content NE V 555 may insert an identifier that verifies the authenticity of the interest packet 505 before transmitting the interest packet 505 to the producer 109. At step 560, content NE V 555 transmits the interest packet 505, with or without the modified path filter 520 or additional identifier, to the producer 109. In an embodiment, content NE V 555 may be one of the content NEs in the ICN that uses a PIT to forward corresponding data packets, as will be further described below with reference to FIG. 6.

In some embodiments, the producer 109 may receive the stateless-forwarded interest packet 505 and identify the name of the content requested by the consumer 107 to extract or create the content requested. The content requested may be forwarded back to the consumer 107 via the same path 125 that the stateless-forwarded interest packet 505 traveled. In one embodiment, the reverse path can be different than the original, even in cases, where the interest path is operational (for instance, with all links being active and routers being operational).

In some embodiments, the header 507 is encapsulated onto the interest packet 505 to form a new encapsulated interest packet 505. In these embodiments, the headers of the interest packet 505 may not be modified, and a header 507 may be encapsulated onto the interest packet 505. Encapsulation may involve an ingress content NE A 150 replicating the content name at the top of the interest packet 505, or with a proper substitute such as a locator for an intermediate or final destination, to prevent improper decapsulation at the egress content NE D 153. In some embodiments, encapsulation can be performed for the data packet even in cases with no encapsulation being performed on the corresponding interest packet, with no loss of efficiency, if the content is not cacheable, or caching on the content is disabled by the producer 109. Since the intermediate content NEs may use the segment identifiers to reverse forward the data packet towards the consumer, content name may not need to be checked.

Figure 6:
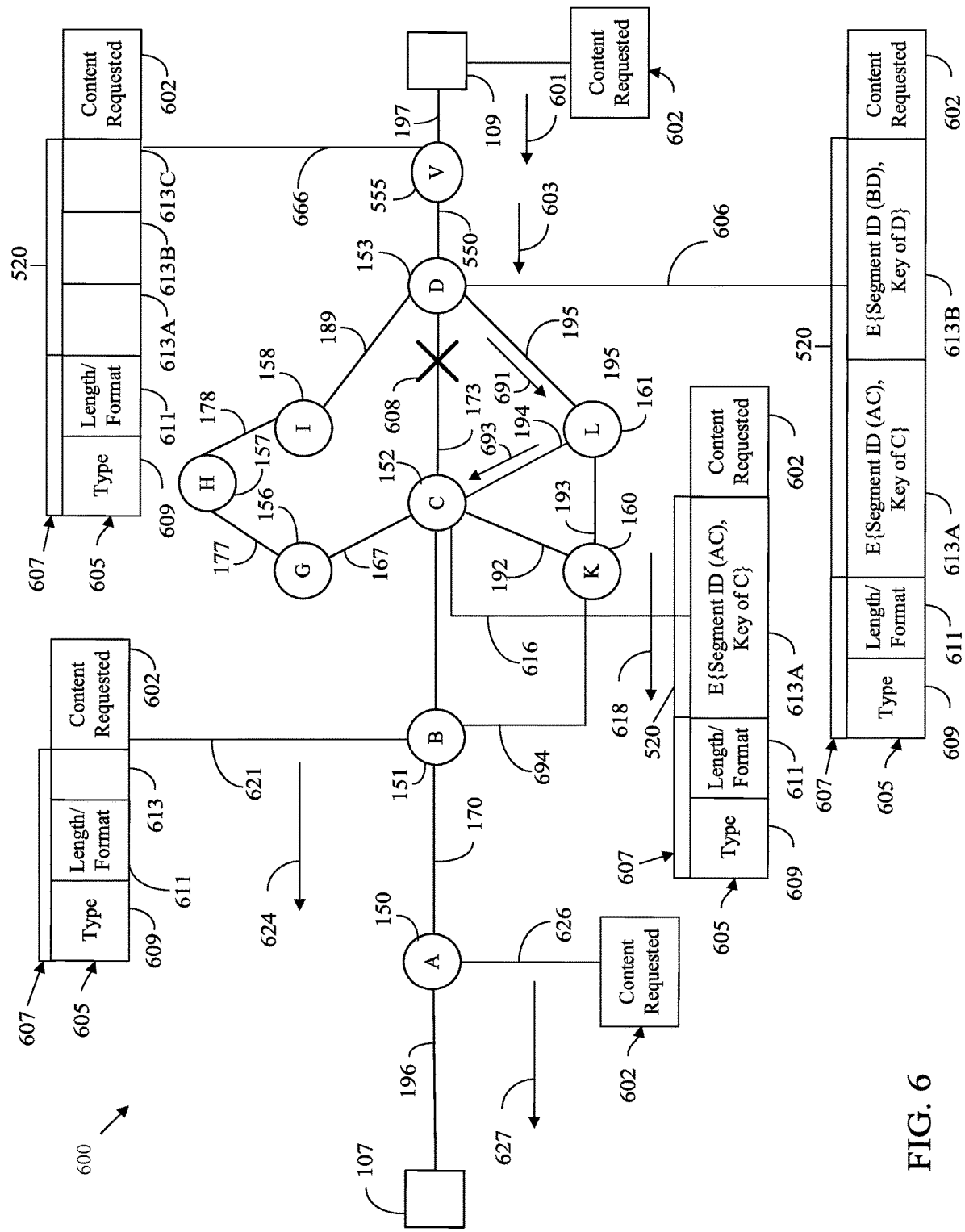
FIG. 6 is a diagram illustrating a method of transmitting a data packet between a producer and the consumer in the ICN when a network failure occurs.

FIG. 6 is a diagram illustrating a method 600 of transmitting a stateless forwarded data packet 605 between a producer 109 and the consumer 107 in an ICN when interface 173 has failed. Similar to the ICN shown in FIG. 5, the ICN shown in FIG. 6 also includes a content NE V 555 as the egress content NE that communicates directly with the producer 109. Method 600 is implemented by the producer 109, content NEs A-D, G-I, K-L, and V 150-153, 156-158, 160-161, and 555, and producer 109. Method 600 may be implemented after a producer 109 receives a stateless-forwarded interest packet 505 from the content NE V 555 and obtains the requested content indicated by the stateless-forwarded interest packet 505. While only ten content NEs A-D, G-I, K-L, and V 150-153, 156-158, 160-161, and 555 are shown in FIG. 6, it should be appreciated that method 600 may be performed across any number of content NEs A-L 150-161.

At step 601, the producer 109 obtains the content requested by the stateless-forwarded interest packet 505 and forwards the content requested to the egress content NE V 555. As discussed above with reference to FIG. 5, egress content NE V 555 stores the modified path filter 520 that corresponds to the interest packet 505 from the consumer 107 requesting the content. In an embodiment, the egress content NE V 555 may be configured to determine the modified path filter 520 to insert as a header 607 onto the data packet 605 based on the stored modified path filters 520. For example, the egress content NE V 555 may identify an entry corresponding to the content requested 602 and/or an identifier of the requesting consumer 107 to determine the corresponding modified path filter 520 to insert onto the data packet 605.

At step 666, content NE V 555 updates the content packet received from the producer 109 by inserting the modified path filter 520 of the stateless-forwarded interest packet 505 requesting the received content packet. Specifically, the content NE V 555 generates the data packet 605 comprising the content requested 602 and updates the data packet 605 to include a header 607 to generate the stateless-forwarded data packet 605. In an embodiment, the header 607 of the stateless-forwarded data packet 605 may include a type field 609, a format or length field 611, and a packet filter field 613. While only these fields of header 607 are shown in FIG. 6, it should be appreciated that header 607 may include additional fields that are not shown in FIG. 6. For example, egress content NE V 555 may add an identifier into the header 607 that may be used by content NEs receiving the data packet 605 to verify the authenticity of the data packet 605 received from the producer 109. In addition, while FIG. 6 only shows the header 607 of the stateless-forwarded data packet 605, it should be appreciated that the stateless-forwarded data packet 605 may include additional headers, such as outer headers and inner headers.

In an embodiment, the type field 609 may comprise, for example, a two bit value indicating that this stateless-forwarded data packet 605 includes content requested. In an embodiment, the format or length field 611 may be similar to the format or length field 511. The packet filter field 613 may include a modified path filter 520, which may have been modified during transmission of the corresponding stateless-forwarded interest packet 505. In an embodiment, the stateless-forwarded data packet 605 comprises the content request 602. In an embodiment, data packet 605 and header 607 may be similar to the interest packets and headers described in the IRTF draft document entitled "CCNx Messages in TLV Format," by M. Mosko, dated Oct. 29, 2017, which is incorporated by reference in its entirety above.

In some embodiments, content NEs may be configured to access the locally stored PIT to determine the next hop by which to transmit a data packet 605 even though the content NE is configured for stateless forwarding. For example, ingress content NEs and egress content NEs that receive data packets and interest packets directly from consumers 106 and producers 109 may be configured to use the PIT since theses data packets and interest packets may not include the path filter 520. For example, consumers 106 and producers 109 may not be configured to add the path filter 520 to the interest packets or data packets. In this case, the ingress content NEs and egress content NEs do not receive the path filter 520 to properly perform stateless forwarding. In these cases, the PIT may be used instead of the path filter to forward the interest and data packets. In an embodiment, content NE V 555 determines to transmit the stateless forwarded data packet 605 to content NE D 153 using the PIT that is locally stored at content NE V 555. This is an example of one of the content NEs in the ICN that is configured to use the PIT even though the content NE V 555 is configured to implement stateless forwarding with encrypted segment identifiers.

In some embodiments, the data packet 605 may travel from the producer 109 to the consumer 107 in the opposite direction along the path 125 than the interest packet 505 traveled. In this way, the term previous content NE for the data packet 605 may be the next content NE for the interest packet 505. Similarly, the term next content NE for the data packet 605 may be the previous content NE for the interest packet 505.

At step 603, the content NE V 555 transmits stateless-forwarded data packet 605 comprising the content requested and the header 607 to the content NE D 153, the previous content NE. The header 607 of the stateless-forwarded data packet 605 received by content NE D 153 may comprise modified path filter 520 with three different path filters that are carried by path filter fields 613A-C. The path filters included in the path filter fields 613A-C are the same as the path filters included in the path filter fields 513A-C of the stateless-forwarded interest packet 505.

At step 606, after receiving the stateless-forwarded data packet 605 from the content NE V 555, content NE D 153 may be configured to extract the last path filter from the path filter field 613C to identify previous content NEs on the path 125. Content NE D 153 may be configured to decrypt the last path filter from the path filter field 613C using security information 270 associated with content NE D 153. For example, as shown in FIG. 5, the third path filter field 513C comprises a segment identifier 280 identifying segment between content NE C 152 and content NE V 555. In one embodiment, segment identifier 613C is modified by NE V 555 before the data packet carrying it is delivered to NE D 153 to include segment identifier for interface 173 between NE C 152 and NE D 153. In one embodiment, the segment identifier 280 in 613C may be encrypted using security information 270 of content NE V 555 or NE D 153. In this embodiment, content NE D 153 may be configured to decrypt the segment identifier 280 using the security information 270 of content NE V 555 or NE D 153 to obtain the segment identifier 280 carried within 613C.

In an embodiment, content NE D 153 may be configured to determine a next interface or next content NE across using the modified path filter 520. For example, content NE D 153 may be configured to determine a next content NE C 152 along which to transmit the stateless-forwarded data packet 605 based on the segment identifier 280 that was extracted from the modified path filter 520. However, as shown in FIG. 6, a failure 608 has occurred on interface 173 along which to transmit the stateless-forwarded data packet 605. As should be appreciated, content NE D 153 may determine that the failure 608 occurs in various ways based on the networking scheme implemented at network 600. For example, content NE D 153 may be configured to determine the failure 608 occurs when the failure 608 actually occurs on the interface 173 between content NE D 153 and content NE C 153. For example, content NE D 153 may receive a notification that interface 173 has failed from another content NE C 153, or in some embodiments, a network controller. In an embodiment, content NE D 153 determines that the failure 608 occurs after content NE D 153 unsuccessfully attempts to transmit data via the interface 173. Therefore, content NE D 153 is unable to transmit the stateless-forwarded data packet 605 to the content NE C 152.

Typically in an ICN, content NE D 153 would discard the stateless-forwarded data packet 605 upon failure 608. That is because if stateful forwarding is used, then PIT information is limited to one-hop information, and neighboring content NEs to NE D 153 other than NE C 152 would not typically carry a matching entry within their PIT to enable further forwarding of the data packet, and if stateless forwarding is used, then path information is encoded hop-by-hop, still limiting its recovery efficiency. However, embodiments of the present disclosure prevent such a discarding of the stateless-forwarded data packet 605 because content NE D 153 locally stores alternative paths 290, segment identifiers 280, and other information related to the neighboring content NEs to enable content NE D 153 to forward the stateless-forwarded data packet 605 to content NE C 152 via an alternative path 290, if content NE C 152 is still reachable. For example, as shown in FIG. 3, content NE D 153 may store a database comprising four different alternative paths 290 that the stateless-forwarded data packet 605 may be forwarded through to reach content NE C 152.

In an embodiment, content NE D 153 may be configured to select one of these alternative paths 290 based on which alternative path 290 is shortest or has the fewest number of hops. In an embodiment, content N D 153 may be configured to select one of the alternative paths 290 based on a cost effectiveness, quality, bandwidth, latency, and/or any other networking characteristic of the alternative path 290.

Suppose content NE D 153 selects the alternative path 290 shown by entry 323 of the database for alternative paths 290 shown in FIG. 3, which includes the alternative path 290 from content NE D 153 to content NE L 161 via interface 195, and from content NE L 161 to content NE C 152 via interface 194. In this case, at step 691, content NE D 153 may transmit the stateless-forwarded data packet 605 to content NE L 161. For example, content NE D 153 may insert a segment identifier 280 into packet filter field 613A that identifies the segment 403 connecting content NE C 152 and content NE D 153 via content NE L 161. As another example, content NE D 153 may include an identifier of content NE C 152 in the header 607 that indicates to content NE L 161 that stateless-forwarded data packet 605 should be forwarded to content NE C 152. In one embodiment, the segment identifier 280 or the identifier of content NE C 152 may be encrypted according to security information 270 related to content NE L 161 before being inserted into header 607 and forwarded to content NE L 161.

When content NE L 161 receives the stateless-forwarded data packet 605 from content NE D 153, content NE L 161 may extract the segment identifier 280 or identifier of content NE C 152 from header 607 to determine that the stateless-forwarded data packet 605 should be forwarded to content NE C 152. At step 693, content NE L 161 may transmit the stateless-forwarded data packet 605 to content NE C 152. In this way, content NE C 152 has received the stateless-forwarded data packet 605 with the content requested by the consumer 107 even though the original path by which the stateless-forwarded data packet 605 was intended to travel had failed. Content NE C 152 is configured to continue transmission of the stateless-forwarded data packet 605 as indicated by the modified path filter 520 in the stateless-forwarded data packet 605.

At step 616, content NE C 152 is configured to extract the last path filter in the modified path filter 520, or the second path filter in the second path filter field 613B, to obtain the encrypted or non-encrypted segment identifier 280 of segment 403B from content NE B 151 to content NE D 153 via content NE C 152. In an embodiment, content NE C 152 is configured to determine the next content NE or interface by which stateless-forwarded data packet 605 should be transmitted using the encrypted or non-encrypted segment identifier 280 of segment 403B. When the segment identifier 280 is not encrypted, content NE C 152 may determine that the stateless-forwarded data packet 605 should be forwarded to next content NE B 151 via interface 171. When the segment identifier 280 is encrypted, then content NE C 152 first decrypts the segment identifier 280 using security information 270 of content NE C 152, or a key of content NE C 152, before determining where to forward the stateless-forwarded data packet 605.

At step 618, content NE C 152 transmits the stateless-forwarded data packet 605 to content NE B 151. At step 621, after receiving the stateless-forwarded data packet 605 from content NE C 152, content NE B 151 may similarly extract the first path filter from the modified path filter 520 carried by path filter field 613A, which includes an encrypted or non-encrypted segment identifier of segment 403A. Similar to the steps performed by content NE C 152, content NE B 151 may also determine that the stateless-forwarded data packet 605 should be forwarded to content NE A 150 via interface 170 based on the first path filter extracted from path filter 613A carrying a portion of the modified path filter 520.

In an embodiment, content NEs would extract the segment identifier, for which they are the end points, especially in cases where the segment identifiers are encrypted. For instance, content NE D 153 would extract segment identifier 613B to determine the next content NEs on the path beyond its next hop NE C 152, which would be (i) content NE B 151 if segment identifier corresponds to segment 403B, and (ii) content NEs A-B 150-151 if segment identifier corresponds to segment 403D.

While FIG. 6 shows the failure 608 to be a failure of an interface 173, a failure may also occur on a content NE 150-161 along a path 125 from a consumer 107 to a producer 109. For example, suppose failure 608 is a failure of the content NE C 152. As should be appreciated, neighboring content NE D 153 may determine that content NE C 152 has failed using various different mechanisms based on the networking scheme implemented at network 600. For example, content NE D 153 may determine that content NE C 152 has failed when content NE C 152 actually fails. For example, content NE D 153 may be notified of content NE C 152's failure by another content NE in the network or, in an embodiment, from a network controller. In an embodiment, content NE D 153 may determine that content NE C 152 has failed upon unsuccessfully attempting to transmit data to content NE C 152. In this case, content NE D 153 may determine, from the modified path filter 520 using segment identifier 613B, that the stateless-forwarded data packet 605 should be transmitted to content NE B 151. Content NE D 153 may store a database comprising alternative paths 290 that the stateless forwarded data packet 605 may be forwarded through to reach content NE B 151. In this case, the alternative path 290 may be from content NE D 153 to content NE L 161 via interface 195, from content NE L 160 to content NE K 161 via interface 193, and from content NE K 161 to content NE B 151 via interface 694. In an embodiment, content NE B 151 may extract the segment identifier 280 or identifier of content NE A 150 using the security information 270, or a symmetric key from content NE C 150, to determine that the stateless-forwarded data packet 605 should be transmitted to content NE A 150.

At step 624, content NE B 151 transmits the stateless-forwarded data packet 605 to content NE A 150 via interface 170. In one embodiment, at step 626, content NE A 150 may decapsulate the stateless-forwarded data packet 605. At step 627, once content NE A 150 receives the stateless-forwarded data packet 605, content NE A 150 may directly transmit the content requested 602 to the consumer 107. By encrypting the segment identifiers 280, outsiders that may observe the stateless-forwarded data packet 605 may not be able to decipher the route that the stateless-forwarded data packet 605 takes, and thus, may not be able to determine the consumer 107 that requested the content carried by the stateless-forwarded data packet 605. Therefore, embodiments of the present disclosure provide a secure and reliable method of routing content packets in an ICN 100, without relying on local databases to store forwarding path for data packets.

Similar to the interest packet 505, in some embodiments, the header 607 is encapsulated onto the data packet 605 to form a new encapsulated data packet 605. In these embodiments, the headers of the data packet 605 may not be modified, and a header 607 may be encapsulated onto the data packet 605.

Figure 7:
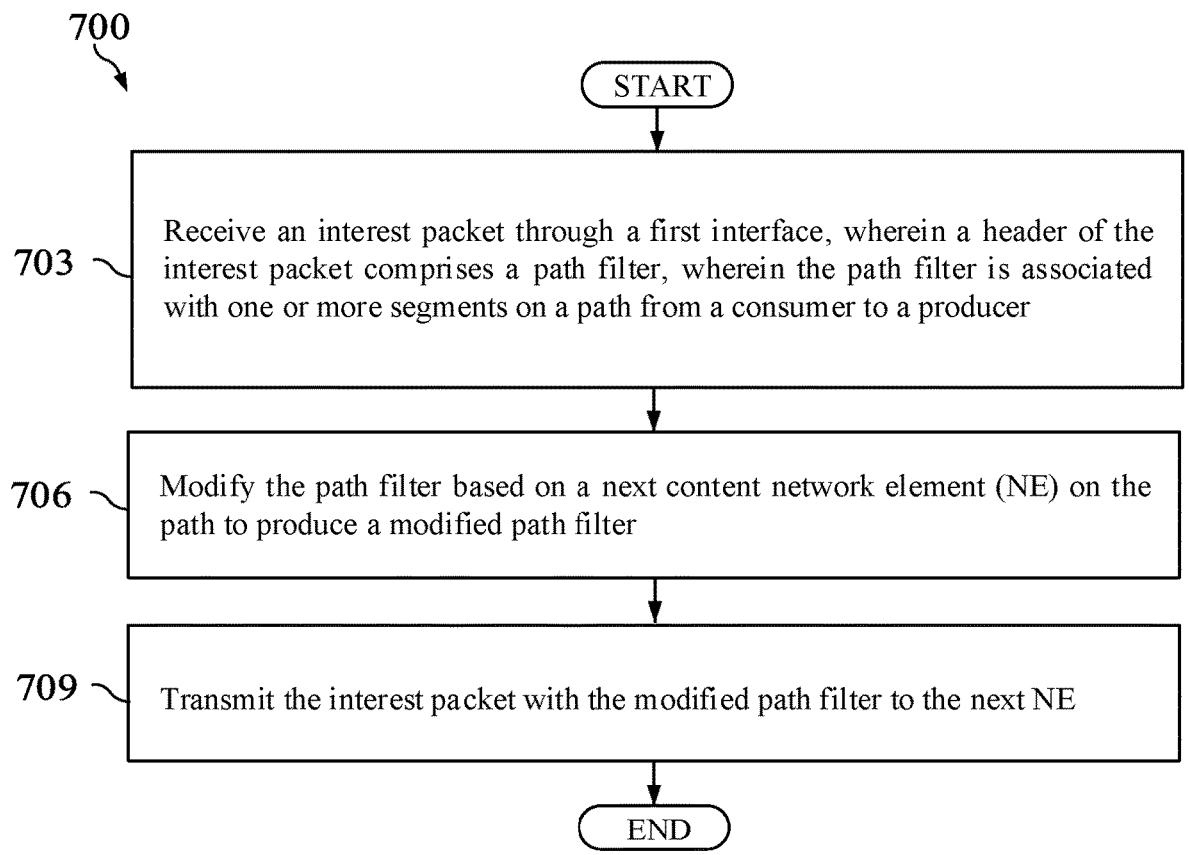
FIG. 7 is a flowchart of a method of implementing secure and reliable routing of interest packets in an ICN.

FIG. 7 is a flowchart of a method 700 of implementing routing of stateless-forwarded interest packets in an ICN 100. Method 700 may be implemented by an NE, such as content NE C 150. Method 700 may be implemented when an interest packet 505 is received. At step 703, an interest packet is received through a first interface. For example, Rx 220 may receive an interest packet 505 through interface 171. The interest packet 505 may be stateless-forwarded to include a header 507 that comprises a modified path filter 520. The modified path filter 520 may be associated with one or more segments 403 on a path 125 from a consumer 107 to a producer 109.

At step 706, the path filter is modified based on a next content NE to produce a modified path filter 520. For example, the routing module 260 of the processor 230 may be configured to modify the path filter 520 to include a segment identifier 280 or a stateless-forwarded segment identifier 280 in the header 507 of the interest packet. The segment identifier 280 may identify a segment 403 associated with content NE D 153. At step 709, the interest packet 505 with the modified path filter 520 in the header 507 is transmitted to the next content NE. For example, Tx 225 may transmit the interest packet 505 with the modified path filter 520 to content NE D 153.

Figure 8:
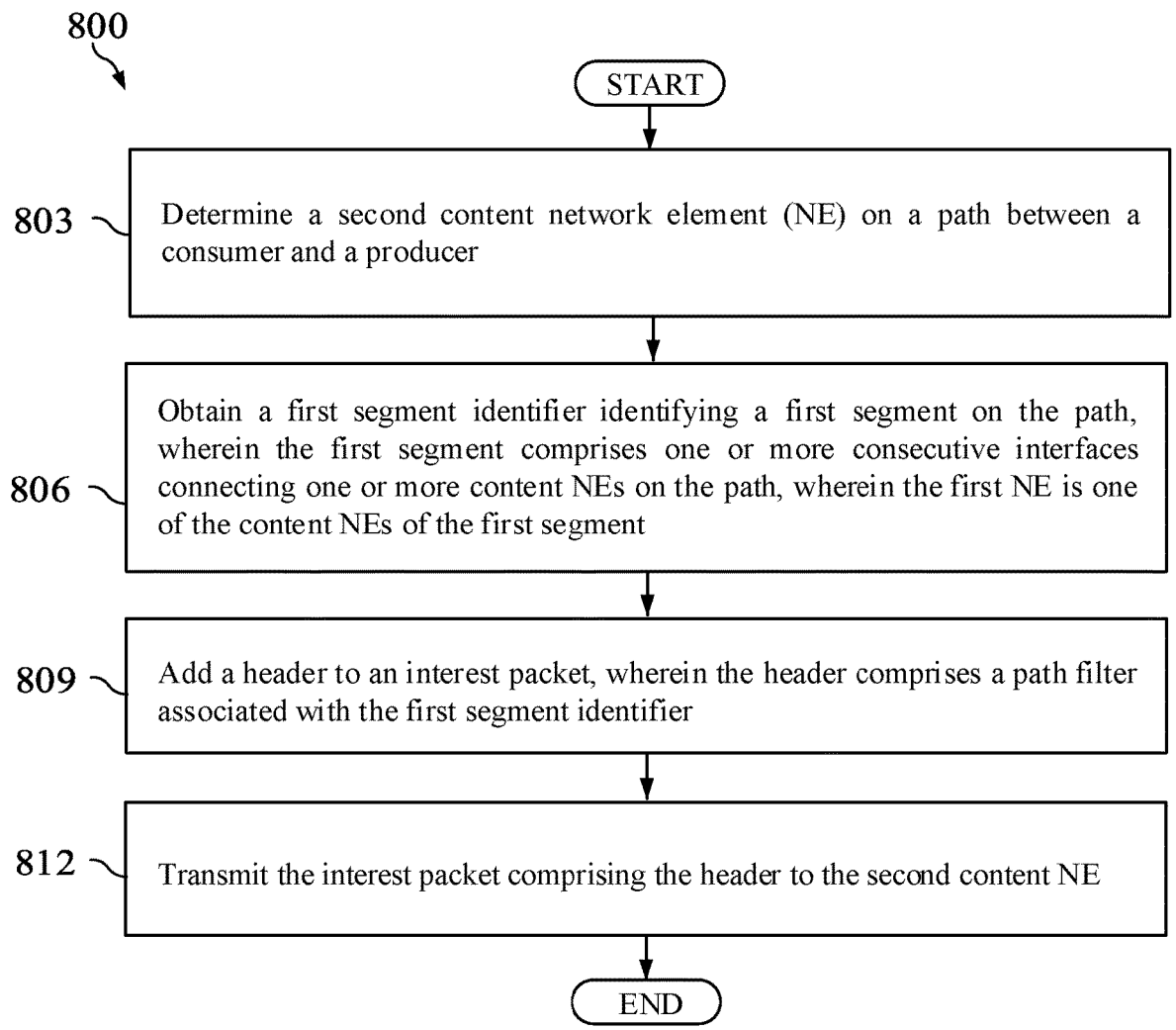
FIG. 8 is a flowchart of a method of implementing secure and reliable routing of interest packets in an ICN.

FIG. 8 is a flowchart of a method 800 of implementing routing of stateless-forwarded interest packets in an ICN 100. Method 800 may be implemented by an NE, such as content NE A 150. Method 800 may be implemented when an interest packet 505 is received. At step 803, a second content NE on a path 125 between a consumer 107 and a producer 109 is determined. For example, routing module 260 of processor 230 may determine that content NE B 151 is a second content NE on the path 125 between the consumer 107 and the producer 109.

At step 806, a first segment identifier 280 that identifies a first segment 403 is obtained. For example, routing module 260 of processor 230 obtains the first segment identifier 280. The first segment 403 comprises one or more consecutive interfaces connecting one or more content NEs on the path. The first content NE may be one of the content NEs of the first segment 403.

At step 809, a header 507 is added to an interest packet 505, where the header comprises a modified path filter 520 associated with the first segment identifier 280. For example, routing module 260 of processor 230 is configured to add the header 507 with the modified path filter 520 associated with the segment identifier 280 to the interest packet 505. At step 812, the interest packet 505 comprising the header 507 is transmitted to the second content NE. For example, Tx 225 transmits the interest packet 505 to content NE B 151.

Figure 9:
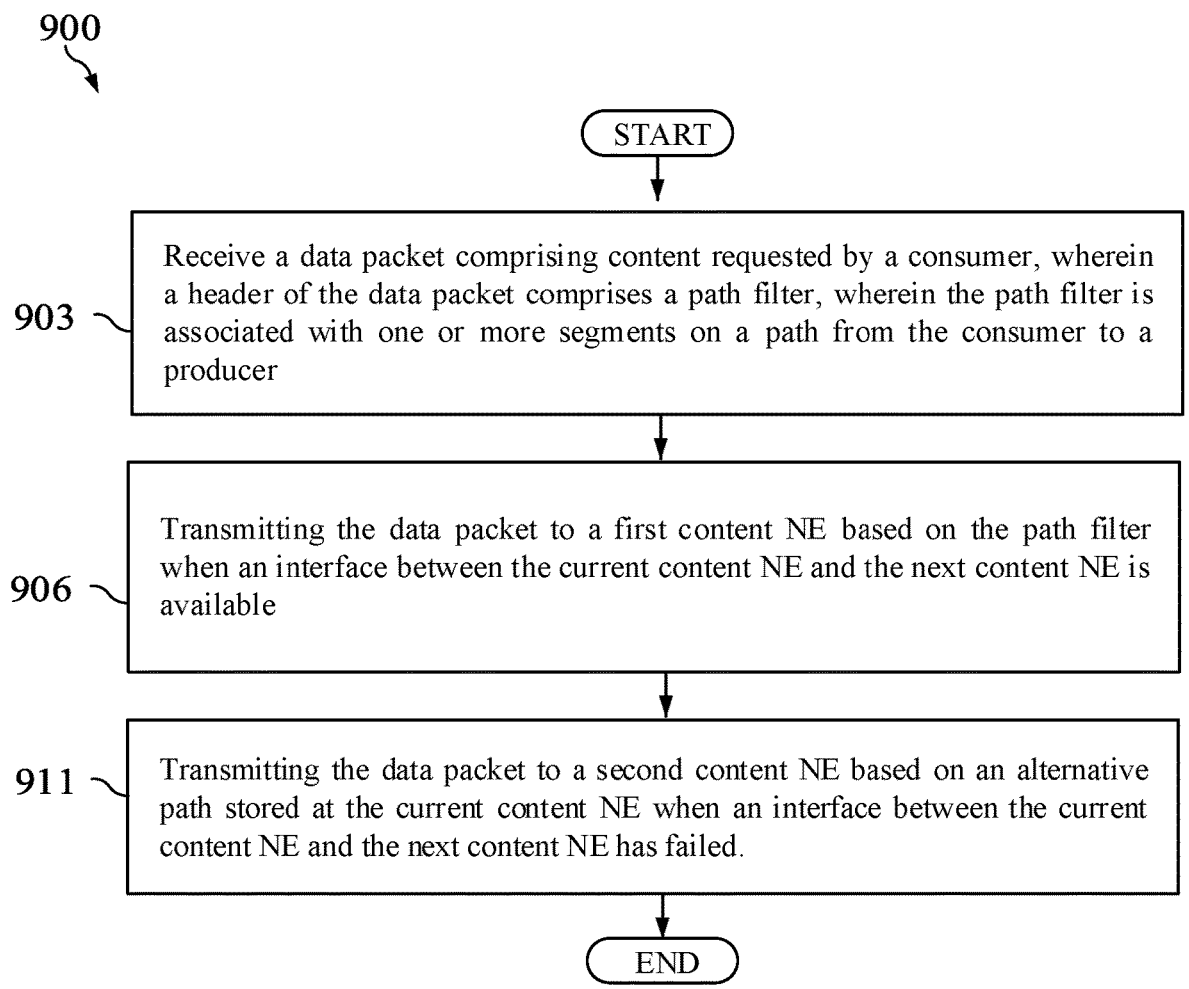
FIG. 9 is a flowchart of a method of implementing secure and reliable routing of data packets in an ICN.

FIG. 9 is a flowchart of a method 900 of implementing secure and reliable routing of data packets in an ICN 100. Method 900 may be implemented by an NE, such as content NE D 153. Method 900 may be implemented after the content NE D 153 has sent an interest packet 505 and when a corresponding data packet 605 is received. At step 903, a data packet 605 is received comprising content requested by a consumer 107. For example, Rx 220 receives a data packet 605 comprising content requested by consumer 107. The header 607 of the data packet 605 may comprise a modified path filter 520 that is associated with one or more segments 403 on a path 125 from the consumer 107 to the producer 109.

At step 906, the data packet 605 is transmitted to a first content NE based on a modified path filter 520 when an interface between the current content NE and the next content NE is available. For example, Tx 225 is configured to transmit the data packet 605 to content NE C 152 based on a modified path filter 520 when interface 172 is available. At step 911, the data packet 605 is transmitted to a second content NE based on an alternative path 290 stored at the current content NE when an interface between the current content NE and the next content NE has failed. For example, Tx 225 is configured to transmit the data packet 605 to content NE L 161 based on an alternative path 290 stored at content NE D 153 when interface 172 fails.

Figure 10A:
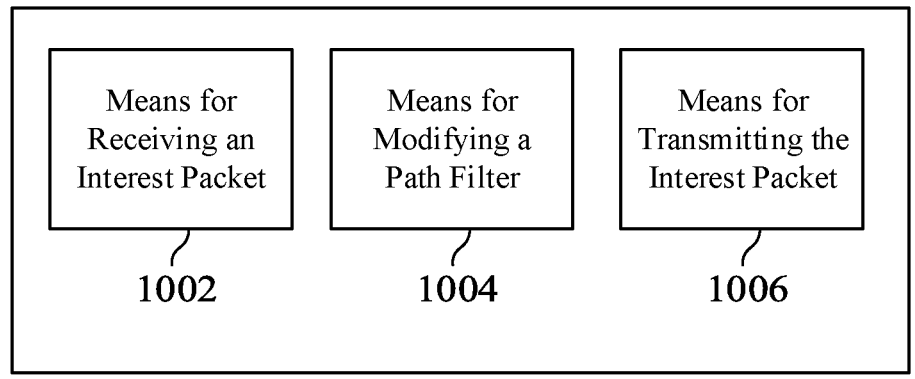
FIGS. 10A-B are diagrams of apparatuses comprising means plus functions elements for implementing ICN forwarding according to various embodiments.
Figure 10B:
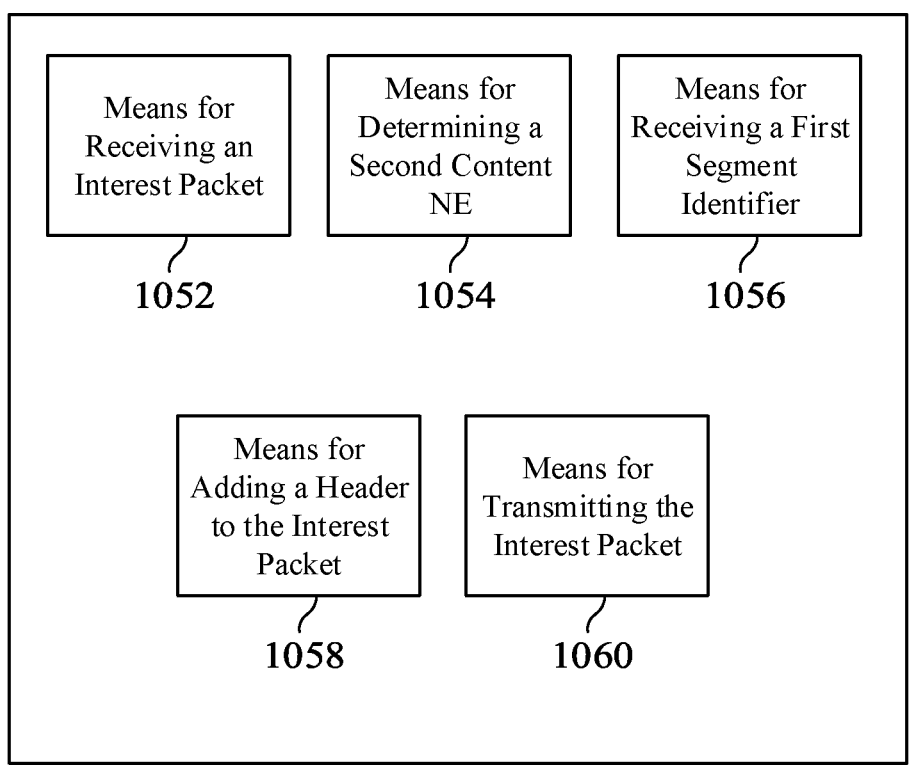

FIGS. 10A-B are diagrams of apparatuses 1000 and 1050 illustrating means plus functions elements for implementing ICN forwarding according to various embodiments. FIG. 10 shows apparatus 1000 comprising a means 1002 for receiving an interest packet through a first interface, wherein a header of the interest packet comprises a path filter, the path filter being associated with one or more segments on a path from a consumer to a producer, a means 1004 for modifying the path filter based on information identifying one or more previous content NEs or one or more next content NEs on the path to produce a modified path filter, and a means 1006 for transmitting the interest packet with the modified path filter to the next content NE. For example, suppose the apparatus 1000 is the NE 200. In this case, the means 1002 for receiving the interest packet may be the Rx 220 of the NE 200. In this case, the means 1004 for modifying the path filter may be the routing module 260 executed by the processor 230 of NE 200. In this case, the means 1006 for transmitting the interest packet may be the Tx 225 of the NE 200.

FIG. 10B shows apparatus 1050 comprising a means 1052 for receiving an interest packet from a consumer, wherein the interest packet is a request for content from a producer, a means 1054 for determining a second content NE on a path between the consumer and the producer, a means 1056 for obtaining a first segment identifier identifying a first segment on the path, the first segment comprising one or more consecutive interfaces connecting one or more content NEs on the path, the first NE being one of the NEs of the first segment, a means 1056 for adding a header to the interest packet, wherein the header comprises a path filter associated with the first segment identifier, and a means 1060 for transmitting the interest packet comprising the header to the second content NE. For example, suppose the apparatus 1050 is the NE 200. In this case, the means 1052 for receiving the interest packet may be the Rx 220 of the NE 200. In this case, the means 1054 for determining the second content NE on the path may be the routing module 260 executed by the processor 230 of NE 200. In this case, the means 1056 for adding a header to the interest packet may also be the routing module 260 executed by the processor 230 of NE 200. Finally, the means 1060 for transmitting the interest packet may be the Tx 225 of the NE 200.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a first content network element (NE) in an information centric network (ICN), the method comprising:

storing, by a memory, a plurality of alternative paths between the first content NE and a second content NE, each of the alternative paths comprising a plurality of identifiers identifying a plurality of NEs along a corresponding alternative path to the second content NE, the second content NE being k hops away from the first content NE, k being an integer value greater than or equal to 2, and each hop comprising an NE of the plurality of NEs;

receiving, by a processor, a plurality of encryption keys from neighboring NEs of the first content NE, the plurality of encryption keys representing neighboring NEs encryption keys, each neighboring NE being uniquely associated with a different encryption key;

storing, by the memory, the encryptions keys;

receiving, by a receiver, an interest packet through a first interface from the second content NE, a header of the interest packet comprising a path filter, the path filter comprising a first segment identifier (ID) identifying a first segment along a path from a consumer to a producer, the first segment comprising a first plurality of content NEs including the second content NE along the path, the path comprising the first content NE and the second content NE, the first segment ID being encrypted using an encryption key associated with the first NE, the path filter being a path that is taken from the consumer to the producer for the interest packet;

adding, by the processor coupled to the receiver and the memory, a second segment ID identifying a second segment along the path to the path filter to obtain a modified path filter, the second segment comprising a second plurality of content NEs including the first content NE along the path, the second segment ID being encrypted using an encryption key associated with a third content NE;

transmitting, by a transmitter coupled to the receiver, the interest packet with the modified path filter to the third content NE along the path;

receiving, by the receiver, a data packet from the third content NE, the data packet comprising content requested by the consumer in response to the interest packet, wherein a header of the data packet comprises the modified path filter;

transmitting, through the first interface, the data packet along the first segment to the second content NE;

determining, by the processor, that a failure in transmitting the data packet occurs along the first segment to the second content NE;

determining, by the processor, a shortest alternative path from the alternative paths between the first content NE and the second content NE in response to determining that the failure occurs along the first segment to the second content NE;

removing, by the processor, the first segment ID from the modified path header of the data packet;

adding, by the processor, a third segment ID identifying the shortest alternative path to the modified path header of the data packet, the third segment ID being encrypted using one of the encryption keys associated with a new content NE identified in the alternative shortest path; and transmitting, by the transmitter, the data packet along the third segment in accordance with the modified path header.

2. The method of claim 1, wherein the header of the interest packet comprises a value in a type field that indicates that the interest packet is a request for content from a producer using stateless packet forwarding.

3. The method of claim 1, wherein the first segment comprises the first plurality of content NEs and a plurality of consecutive links interconnecting the first plurality of content NEs, wherein an endpoint of the first segment is the second content NE.

4. The method of claim 1, wherein k is an integer value greater than or equal to 3.

5. The method of claim 1, further comprising:
removing, by the processor, the second segment ID from the header; and
adding, by the processor, a third segment ID identifying the shortest alternative path to the modified path header.

6. The method of claim 5, further comprising decrypting, by the processor, the second segment ID of the modified path filter in the header of the data packet in response to determining that the second segment ID in the modified path filter is encrypted.

7. A first content network element (NE) configured to operate in an information centric network (ICN), comprising:

a memory configured to store a plurality of alternative paths between the first content NE and a second content NE in the ICN, each of the alternative paths comprising a plurality of identifiers identifying a plurality of NEs along a corresponding alternative path to the second content NE, the second content NE being k hops away from the first content NE, k being an integer value greater than or equal to 2, and each hop comprising an NE of the plurality of NEs;

a receiver configured to:
receive a plurality of encryption keys from neighboring NEs of the first content NE, the plurality of encryption keys representing neighboring NEs encryption keys, each neighboring NE being uniquely associated with a different encryption, the memory is further configured to store the encryption keys;

receive an interest packet from the second content NE, the interest packet being a request for content from a producer, a header of the interest packet comprising a path filter, the path filter comprising a first segment identifier (ID) identifying a first segment along a path from a consumer to the producer, the first segment comprising a first plurality of content NEs including the second content NE along the path, the path comprising the first content NE and the second content NE, the first segment ID being encrypted using an encryption key associated with the first NE, the path filter being a path that is taken from the consumer to the producer for the interest packet;

a processor coupled to the receiver and the memory, the processor being configured to add a second segment ID identifying a second segment along the path to the path filter to obtain a modified path filter, the second segment comprising a second plurality of content NEs including the first content NE along the path, the second segment ID being encrypted using an encryption key associated with a third content NE;

a transmitter coupled to the processor and configured to transmit the interest packet with the modified path filter to the third content NE along the path, wherein the receiver is further configured to receive a data packet from the third content NE, the data packet comprising content requested by the consumer in response to the interest packet, wherein a header of the data packet comprises the modified path filter, wherein the transmitter is further configured to transmit the data packet along the first segment to the second content NE;

wherein the processor is further configured to:
determine that a failure in transmitting the data packet occurs along the first segment to the second content NE; and determine a shortest alternative path from the alternative paths between the first content NE and the second content NE in response to the failure occurring along the first segment to the second content NE;

remove the first segment ID from the modified path header of the data packet; and add a third segment ID identifying the shortest alternative path to the modified path header of the data packet, the third segment ID being encrypted using one of the encryption keys associated with a new content NE identified in the alternative shortest path; and wherein the transmitter is further configured to transmit the data packet along the third segment in accordance with the modified path header.

8. The first content NE of claim 7, wherein the interest packet comprises a name of the content requested by the consumer.

9. The first content NE of claim 7, wherein k is an integer value greater than or equal to 3.

10. The first content NE of claim 7, wherein the transmitter is further configured to transmit an encryption key associated with the first content NE to a plurality of neighboring content NEs.

11. A computer program product comprising computer-executable instructions for storage on a non-transitory computer-readable medium that, when executed by a first content network element (NE), cause the first content NE to:

store a plurality of alternative paths between the first content NE and a second content NE, each of the alternative paths comprising a plurality of identifiers identifying a plurality of NEs along a corresponding alternative path to the second content NE, the second content NE being k hops away from the first content NE, k being an integer value greater than or equal to 2, and each hop comprising an NE of the plurality of NEs;

receive a plurality of encryption keys from neighboring NEs of the first content NE, the plurality of encryption keys representing neighboring NEs encryption keys, each neighboring NE being uniquely associated with a different encryption key;

store the encryption keys;

receive an interest packet through a first interface from the second content NE, a header of the interest packet comprising a path filter, the path filter comprising a first segment identifier (ID) identifying a first segment along a path from a consumer to a producer, the first segment comprising a first plurality of content NEs including the second content NE along the path, the path comprising the first content NE and the second content NE, the first segment ID being encrypted using an encryption key associated with the first content NE, the path filter being a path that is taken from the consumer to the producer for the interest packet;

add a second segment ID identifying a second segment along the path to the path filter to obtain a modified path filter, the second segment comprising a second plurality of content NEs including the first content NE along the path, the second segment ID being encrypted using an encryption key associated with a third content NE;

transmit the interest packet with the modified path filter to the third content NE;

receive a data packet from the third content NE, the data packet comprising content requested by the consumer in response to the interest packet, wherein a header of the data packet comprises the modified path filter;

transmit, through the first interface, the data packet along the first segment to the second content NE;

determine that a failure in transmitting the data packet occurs along the first segment to the second content NE;

determine a shortest alternative path from the alternative paths between the first content NE and the second content NE in response to the failure occurring along the first segment to the second content NE;

remove the first segment ID from the modified path header of the data packet;

add a third segment ID identifying the shortest alternative path to the modified path header of the data packet, the third segment ID being encrypted using one of the encryption keys associated with a new content NE identified in the alternative shortest path; and transmit the data packet along the third segment ID in accordance with the modified path header.

12. The computer program product of claim 11, wherein the first segment comprises the plurality of content NEs and a plurality of consecutive interfaces interconnecting the first plurality of content NEs, and wherein an endpoint of the first segment is the second content NE.

13. The computer program product of claim 11, wherein k is an integer value greater than or equal to 3.

* * * * *